(12) United States Patent
Jarvis et al.

(10) Patent No.: US 9,030,355 B2
(45) Date of Patent: May 12, 2015

(54) LOCATION FIX FROM UNKNOWN POSITION

(75) Inventors: Murray Robert Jarvis, Stapleford (GB); James Burgess Tidd, Stockholm (SE); Anthony Richard Pratt, Northamptonshire (GB)

(73) Assignee: Cambridge Silicon Radio Limited, Cambridge (GB)

( * ) Notice: Subject to any disclaimer, the term of this patent is extended or adjusted under 35 U.S.C. 154(b) by 420 days.

(21) Appl. No.: 13/344,098

(22) Filed: Jan. 5, 2012

(65) Prior Publication Data

US 2013/0002478 A1  Jan. 3, 2013

(30) Foreign Application Priority Data

| Jan. 5, 2011 | (GB) | 1100114.6 |
| Jan. 5, 2011 | (GB) | 1100115.3 |
| Jan. 5, 2011 | (GB) | 1100116.1 |
| Jan. 5, 2011 | (GB) | 1100117.9 |
| Mar. 28, 2011 | (GB) | 1105217.2 |

(51) Int. Cl.
| *G01S 19/42* | (2010.01) |
| *G01S 19/25* | (2010.01) |
| *G01S 19/24* | (2010.01) |
| *G01S 19/09* | (2010.01) |

(52) U.S. Cl.
CPC ............ *G01S 19/252* (2013.01); *G01S 19/09* (2013.01); *G01S 19/24* (2013.01)

(58) Field of Classification Search
USPC ............................ 342/357.25, 357.23, 357.43
See application file for complete search history.

(56) References Cited

U.S. PATENT DOCUMENTS

| 4,928,107 | A |  | 5/1990 | Kuroda |
| 5,323,163 | A |  | 6/1994 | Maki |
| 5,552,794 | A | * | 9/1996 | Colley et al. ............. 342/357.25 |
| 6,102,338 | A |  | 8/2000 | Yoshikawa |
| 6,191,731 | B1 |  | 2/2001 | McBurney et al. |
| 6,329,945 | B1 |  | 12/2001 | Hynes |
| 6,392,593 | B1 |  | 5/2002 | Pemble |
| 6,417,801 | B1 |  | 7/2002 | Van Diggelen |
| 6,650,288 | B1 |  | 11/2003 | Pitt |

(Continued)

FOREIGN PATENT DOCUMENTS

| EP | 0353849 | 2/1990 |
| EP | 0451607 | 10/1991 |

(Continued)

OTHER PUBLICATIONS

UK Search Report dated May 14, 2012, in corresponding UK application.

(Continued)

*Primary Examiner* — Harry Liu
(74) *Attorney, Agent, or Firm* — RatnerPrestia

(57) ABSTRACT

An apparatus for determining a location of a receiver by using signals received by the receiver from a number of satellites, the apparatus being configured to, when the receiver has been unable to decode a time-of-transmission from the satellite signals, determine a location for the receiver by use of an algorithm that takes an estimate of the location of the receiver as an input, and, when an estimate of the location of the receiver is unavailable, determine an approximate location of the receiver in dependence on the satellite signals and input that approximate location into the algorithm as the estimate of the location of the receiver.

23 Claims, 18 Drawing Sheets

(56) References Cited

U.S. PATENT DOCUMENTS

| | | | |
|---|---|---|---|
| 6,720,915 | B2 | 4/2004 | Sheynblat |
| 6,725,158 | B1 | 4/2004 | Sullivan |
| 6,727,850 | B2 | 4/2004 | Park |
| 6,734,821 | B2 | 5/2004 | Van Diggelen |
| 6,771,215 | B2 | 8/2004 | Akopian |
| 6,917,330 | B2 | 7/2005 | Ohmura |
| 7,064,709 | B1 | 6/2006 | Weisenburger et al. |
| 7,095,368 | B1 | 8/2006 | vanDiggelen |
| 7,142,155 | B2 | 11/2006 | Iwami |
| 7,152,015 | B2 | 12/2006 | Manzen |
| 7,295,155 | B2 | 11/2007 | Wakamatsu |
| 7,522,098 | B2 | 4/2009 | Van Diggelen |
| 7,847,728 | B2 | 12/2010 | Thomson et al. |
| 7,961,142 | B2 * | 6/2011 | Nagahara .................. 342/357.25 |
| 2003/0016172 | A1 | 1/2003 | Natsume |
| 2003/0197639 | A1 | 10/2003 | Sheynblat |
| 2003/0224802 | A1 | 12/2003 | Nir |
| 2004/0041729 | A1 | 3/2004 | Rowitch |
| 2004/0104840 | A1 | 6/2004 | Awata |
| 2004/0130485 | A1 | 7/2004 | Rapoport |
| 2004/0145518 | A1 | 7/2004 | Toda |
| 2005/0055160 | A1 | 3/2005 | King |
| 2005/0101248 | A1 | 5/2005 | Vollath |
| 2006/0055596 | A1 | 3/2006 | Bryant |
| 2007/0216572 | A1 * | 9/2007 | Schnabel ................... 342/357.1 |
| 2007/0241958 | A1 | 10/2007 | Nicholson et al. |
| 2008/0048910 | A1 | 2/2008 | Wang et al. |
| 2008/0074317 | A1 | 3/2008 | Harper |
| 2008/0291979 | A1 | 11/2008 | Normark |
| 2009/0040104 | A1 | 2/2009 | Mitsunaga |
| 2009/0195446 | A1 | 8/2009 | Liao |
| 2009/0195451 | A1 | 8/2009 | Henkel |
| 2009/0322607 | A1 | 12/2009 | Mitsunaga |
| 2010/0138147 | A1 | 6/2010 | T'Siobbel |
| 2010/0207810 | A1 | 8/2010 | Terashima |
| 2010/0302099 | A1 | 12/2010 | Grossnickle |
| 2011/0037646 | A1 | 2/2011 | Tajima |
| 2011/0068977 | A1 * | 3/2011 | Thomson et al. ........ 342/357.43 |
| 2011/0080318 | A1 | 4/2011 | Alizadeh-Shabdiz |
| 2011/0248887 | A1 | 10/2011 | Whelan et al. |
| 2012/0182181 | A1 | 7/2012 | Dai |

FOREIGN PATENT DOCUMENTS

| | | |
|---|---|---|
| WO | 0058748 | 10/2000 |
| WO | 2005081010 | 9/2005 |
| WO | WO 2008/040896 A2 | 4/2008 |
| WO | WO 2011/127450 A2 | 10/2011 |

OTHER PUBLICATIONS

Peterson, et al., "GPS Receiver Structures for the Urban Canyon," pp. 1323-1332, Proceedings of the 8th International Technical Meeting of the Satellite Division of The Institute of Navigation (ION GPS 1995), Sep. 12-15, 1995, Palm Springs, CA.

Lannelongue, et al., "Fast Acquisition Techniques for G.P.S. Receivers," pp. 261-269, Proceedings of the 54th Annual Meeting of the Institute of Navigation, Jun. 1-3, 1998, Denver, CO.

Van Diggelen, "A-GPS: Assisted GPS, GNSS and SBAS 72," Chapter 4, Coarse-Time Navigation: Instant GPS, Artech House, Boston, 2009.

Copending U.S. Appl. No. 13/344,297, filed on Jan. 5, 2012.
Copending U.S. Appl. No. 13/344,410, filed on Jan. 5, 2012.
Copending U.S. Appl. No. 13/344,494, filed on Jan. 5, 2012.
Copending U.S. Appl. No. 13/344,524, filed on Jan. 5, 2012.

International Preliminary Report on Patentability for International Appln. No. PCT/EP2012/050137, dated Jul. 10, 2013.

International Search Report and Written Opinion of the International Searching Authority issued in PCT/EP2012/050136 dated May 25, 2012.

International Search Report issued in PCT/EP2012/050134 dated May 11, 2012.

UK Search Report dated May 16, 2012, in corresponding UK application GB1100115.3.

UK Search Report dated May 18, 2012, in corresponding UK application GB1100117.9.

UK Search Report dated May 22, 2012, in corresponding UK Application GB 1100116.1.

Written Opinion for International Application No. PCT/EP2012/050137 dated Feb. 28, 2013.

Office Action for U.S. Appl. No. 13/344,494, dated Dec. 24, 2014.

GB Search and Examination Report issued in related GB Application No. GB1419325.4, dated Nov. 21, 2014.

Office Action dated Mar. 13, 2015, U.S. Appl. No. 13/344,297.
Office Action dated Mar. 2, 2015, U.S. Appl. No. 13/344,410.

UK Examination Report issued in UK Application No. GB1419325.4, dated Feb. 3, 2015.

* cited by examiner

LOCATION FIX FROM UNKNOWN POSITION

BACKGROUND OF THE INVENTION

The invention relates to an apparatus and a method for locating a Global Navigation Satellite System (GNSS) receiver when estimates of its position and absolute time are unknown.

Satellite Location-Systems

The Global Positioning System (GPS) is an example of a GNSS navigation system in which a receiver determines its position by precisely measuring the arrival time of signalling events received from multiple satellites. Each satellite transmits a navigation message containing the precise time when the message was transmitted and ephemeris information. Each sub-frame of the navigation message starts with a telemetry word (TLM) which contains a preamble (10001011), a Telemetry Message and an Integrity Status Flag. The start of the sub-frame may be detected by means of a preamble sequence in the TLM. Each sub-frame also includes a handover word (HOW) and the sub-frame ID. The first 17 bits of the HOW give a truncated version of the exact time of the week (TOW) at which the satellite will transmit the next sub-frame according to the local version of GPS time held by the satellite's clock. The ephemeris information includes details about the satellite's orbit and corrections for the satellite's own clock, in comparison with GPS time. The ephemeris and clock correction parameters may be known collectively as ephemeris information. Alternative formats for the navigation data are used for GPS as defined (for example) in the CNAV message; and in other GNSS broadcasts, as defined in the appropriate signal-in-space interface control documentation.

GPS signals are formed of a navigation message binary phase shift modulated (BPSK) onto a direct sequence spread spectrum signal. The spread spectrum signal comprises a unique pseudo-noise (PN) code that identifies the satellite. For civil applications, GPS signals are transmitted using the L1, L2 and L5 frequencies. On the L1 frequency, the civil signal (dual use transmission) uses a spreading code known as the C/A code (coarse/acquisition). The C/A code has a sequence length of 1023 chips and changes to the next designated state at a 1.023 MHz chipping rate. The code sequence repeats every millisecond. The code sequence has an identified start instant when the two code generators in the satellite (as shown in IS GPS 200) transition to the all '1's' state. This instant is known as the code epoch. Some satellites may use an alternative, but equivalent, code sequence mechanisation.

After various transport delays in the satellite, the code epoch is broadcast through the timing and sequencing of specific code states assigned to the satellite. This signalling event can be recognised, in suitably adapted receivers, through a process of aligning a replica code with the code received from each satellite.

The L1 C/A code navigation message has a data rate of 50 bits per second, lower than the code rate, and its data bit or symbol transitions are synchronised with the start of the C/A code sequence. Each bit of the navigation message lasts for 20 milliseconds and thus incorporates 20 repetitions of the C/A code. The navigation message is constructed from a 1500-bit frame consisting of five 300-bit sub-frames. Each sub-frame lasts for 6 seconds. The satellite transmits the navigation message and C/A code using a carrier frequency that is an integer multiple of 10.23 MHz (for the L1 carrier, the multiple is 154). At the start of a GPS week, a satellite will transmit the first code cycle, of the first data bit, of the first sub-frame of the first frame of the navigation data.

In addition to the time and ephemeris information, the navigation message also contains the satellite constellation almanac, parameters representing a model of the ionospheric and tropospheric delay, health parameters and other information used by some receivers. There are 25 different frames of data broadcast from each satellite. Each frame contains identical information (apart from time) in sub-frames 1-3 inclusive but cycles through a pre-assigned sequence of data in sub-frames 4 and 5, which contain almanac and other information. The ephemeris information, including the satellite clock biases, is periodically refreshed by the GPS Control Segment, typically every 2 hours, so that the navigation data message is representative of the current orbit model and status of each satellite. There are indicators in the navigation message which provide the user with knowledge of when the ephemeris and clock data has been changed. Details of these changes are set out in the GPS interface standard, IS GPS 200.

As mentioned above, a GPS receiver may determine the time-of-arrival of a signalling event through a process of aligning a replica code with the code received from each satellite. The receiver may also use the TOW information contained in the navigation message to determine the time when the signalling event was transmitted. From this, the receiver can determine the transit time for the signalling event (from which it can determine the distance between it and the satellite), together with the position of the satellite at the time when the signalling event was transmitted (using the ephemeris information). The receiver can then calculate its own position. Theoretically, the position of the GPS receiver can be determined using signals from three satellites, providing the receiver has precise knowledge of absolute time or knowledge of part of the positions, such as altitude. However, in practice GPS receivers use signals from four or more satellites to determine an accurate three-dimensional location solution because an offset between the receiver clock and GPS time introduces an additional unknown into the calculation.

If the satellite signal reception is poor (commonly known as weak signal conditions), or if the receiver only receives a short burst of the signal, the receiver may not be able to decode the TOW information. Without this information, the GPS receiver may be unable to determine the distance between it and the satellite with sufficient accuracy because the receiver will not know the time when the signalling event was transmitted. Under weak signal conditions or briefly glimpsed signals, the receiver may also be unable to recognise the start of a sub-frame since it may not be able to decode the preamble sequence in the TLM.

A receiver that has been unable to decode the TLM and TOW information in the navigation message may nonetheless be able to deduce some timing information even under weak signal conditions or from briefly-glimpsed signals. For example, the receiver may be able to determine a time shift between the satellite signal's spreading (PN) code and a locally generated version of the same, e.g. by correlating the received signal with a locally generated replica of the PN code or by using an equivalent signal processing technique. This time shift represents at least part of the transit time for the satellite signal. However, since both the PN code in the signal and the locally generated replica code are of finite length in space (known as the code wavelength), the correlation operation can only identify a part of the total time shift. This part of the total time shift represents a fractional part of the signal transit time between satellite and the receiver. The integer number of code repetition intervals the signal took to travel between the satellite and the receiver cannot be measured by the receiver, nor can the integer number of code repetition intervals from the start of week in order to establish the absolute time of transmission.

In order to compute its position accurately, the receiver also needs to be able to resolve discrepancies between the various clocks in the system. GPS time is defined by an ensemble of clocks generally located at the US Naval Observatory in Washington. Each satellite has its own operating clock (usually one of three on board the space vehicle), which is approximately synchronised with GPS time. In practice, however, the satellite clock is offset from GPS time by a small amount. The receiver clock is also likely to be offset from GPS time, at least prior to an initial location solution. Uncorrected, these clock biases introduce significant errors into the location calculation.

"GPS Receiver Structures for the Urban Canyon" by Peterson et al. presents a method for computing the position of a GPS receiver in a deep urban canyon, in which the receiver may obtain brief glimpses of satellites but rarely sees three or more satellites simultaneously. The method addresses the problem of having an unknown common system time by expanding the location calculation to encompass an additional satellite range measurement and an additional unknown parameter termed "coarse time". The Peterson paper thus proposes a solution in which signals from five satellites are required for a 3D-location solution.

"Fast Acquisition Techniques for GPS Receivers" by Lannelongue et al. also presents a method for computing the position of a GPS receiver in which the common system time is unknown.

The integer millisecond ambiguity is also addressed by U.S. Pat. No. 6,417,801, which describes a way of estimating the integer milliseconds by calculating the geometric pseudo-range of the receiver to the satellite. The geometric pseudo-range is calculated using an estimated position of the GPS receiver and the position of the satellite at an estimated GPS time. U.S. Pat. No. 6,417,801 estimates the number of integer milliseconds that the signal took to travel between the satellite and the GPS receiver from the estimated pseudo-range and adds this to a measured, sub-millisecond pseudo-range to obtain a 'full' pseudo-range. The full pseudo-ranges from five satellites are then used to calculate the location of the GPS receiver. This technique is also described in "A-GPS: Assisted GPS, GNSS and SBAS 72" by Frank Van Diggelen (see chapter 4).

Mathematical techniques may be used to change the unknowns output by the location calculation. For example, U.S. Pat. No. 7,064,709 explains that calculating the integer number of milliseconds using estimated pseudo-ranges is not always sufficiently accurate and instead proposes a method whereby a common transit delay, represented as an number of integer milliseconds, is inserted as one of the unknowns to be determined as part of the location calculation. U.S. Pat. No. 7,064,709 also proposes that differences may be used to create four equations and four unknowns from the five equations using satellite measurements.

U.S. Pat. No. 6,191,731 also describes making five range measurements to five satellites and solving the five resulting equations by weighting and subtracting one from the four others in order to eliminate one of the unknown terms. This is a purely mathematical procedure which, in this example, cancels the user clock error term from the five linearised position equations.

These techniques are similar to the differencing methods used in some land survey implementations in which GPS time is known. Signals from two different satellites are differenced at one receiver and that difference is then subtracted from a similar difference calculated at another receiver. This double-difference technique allows unknowns such as the satellite and receiver clock errors to be eliminated from the calculation. These techniques are generally operative only within a zone where the location solution converges with a low error.

Another method is the so-called 'Single-Difference' method in which one of the satellites is designated as a reference satellite. The estimated distances and transit times from four satellites are compared with the equivalent values for a reference satellite. This has two advantages: first, it addresses the issue of integer ambiguity in the measured times-of-arrival; and second, it removes the receiver clock bias as an unknown at the instant of measurement, as the arrival of each signalling event is measured with reference to the arrival of the signalling event from the reference satellite. In this way, the receiver clock bias does not contaminate the measurements and does not enter into the location calculations. The receiver clock is used, however, to provide a timescale for measuring the time differences between the arrival times of the various signalling events. This method is described in more detail below.

The "Single-Difference" Approach

FIG. 1 shows a GPS receiver 101 receiving GPS signals 107a and 107b from two GPS satellites, 103 and 104. Each satellite is travelling according to a respective orbit (105 and 106). The GPS receiver may designate one of these satellites as a reference satellite. This satellite sets the time base against which all other signals are measured.

First consider the case of a signal received from single satellite 104. The time-of-arrival of signalling event 107b at GPS receiver 101 can be expressed as:

$$t_{rx,i} = t_{sat,i} + \frac{D_i(t_{sat,i})}{c} + \frac{(B_U - B_{SV,i})}{c} + \frac{(d_{iono,i} + d_{tropo,i})}{c} + \varepsilon_i \quad (1)$$

where:

$t_{rx,i}$ is the arrival time of the signalling event transmitted by satellite i at the receiver (which in this instance is the full time-of-arrival rather than just the fractional part; ambiguity in the measured time-of-arrival and how it may be resolved are discussed later);

$t_{sat,i}$ is the time when the signalling event was transmitted;

$D_i(t_{sat,i})$ is the distance between the receiver and satellite i;

$B_U$ is the receiver clock bias, expressed in terms of distance;

$B_{SV,i}$ is the clock bias of satellite i, expressed in terms of distance, and is a function of $t_{sat,i}$;

$d_{iono,i}$ and $d_{tropo,i}$ are the excess delays due to signal transition through the ionosphere and troposphere, over those in free space, expressed in terms of distance;

$\varepsilon_i$ is the measurement error, which is mainly due to noise and multipath errors; and c is the speed of light in meters per second.

Equation (1) can be extended by comparing signalling event 107b received from satellite 104 with signalling event 107a from reference satellite 103. Rather than consider each time-of-arrival independently, the receiver may measure only the difference between the arrival times. This eliminates the receiver clock bias, which is identical for both. The receiver clock bias is the difference between the time held in the receiver clock to an absolute or reference time, such as GPS time. If it is assumed that the transmitted events occurred at the same GPS time (as measured by each satellite), this gives the following equation:

$$t_{rx,i} - t_{rx,0} = \frac{D_i(t) - D_0(t)}{c} + \frac{(B_{SV,0} - B_{SV,i})}{c} + \frac{(d_{iono,i} - d_{iono,0} + d_{tropo,i} - d_{tropo,0})}{c} + (\varepsilon_i - \varepsilon_0) \quad (2)$$

Where the reference satellite is designated by the subscript '0' and t designates the absolute time corresponding to the signalling event transmitted by each satellite.

A problem with solving equation (2) is that under weak signal conditions the receiver may be unable to distinguish the arrival of repetitive events from each other. For example, a GPS receiver may be able to detect the start of each code epoch, even under weak signal conditions, but those code epochs repeat at 1 ms intervals. Without being able to decode more of the signal, therefore, the receiver is unable to directly identify which of the repetitive signalling events received from the $i^{th}$ satellite and the reference satellite were transmitted at the same GPS time (as measured by each satellite). It is therefore unclear which times-of-arrival should be compared with each other in calculating $t_{rx,i} - t_{rx,0}$.

One option is to predict a likely time-of-arrival for a signalling event transmitted by the $i^{th}$ satellite using the time-of-arrival of the corresponding signalling event from the reference satellite, estimated distances between the receiver and each of the satellites and the differences in the clock biases between the satellites.

The distance between the $i^{th}$ satellite and the receiver may be defined as the Euclidean norm of the difference in vector positions, $(x_{sat,i} - x)$, where $x_{sat,i}$ is the position vector of the $i^{th}$ satellite and x is the position vector of the receiver. The estimated distance between the $i^{th}$ satellite and the receiver may be defined as the Euclidean norm of the difference in vector positions, $(x_{sat,i}(t_e) - x_e)$, where $x_{sat,i}(t_e)$ is the position vector that corresponds to the location of the $i^{th}$ satellite at an initial estimate of (GPS) time $t_e$ and $x_e$ is the position vector corresponding to an initial estimate of the location of the receiver. This gives rise to the following equations:

$$D_i(t) = \sqrt{(x_{SV,i}(t) - x)^2 + (y_{SV,i}(t) - y)^2 + (z_{SV,i}(t) - z)^2}$$

$$\hat{D}_i(t_e) = \sqrt{(x_{SV,i}(t_e) - x_0)^2 + (y_{SV,i}(t_e) - y_0)^2 + (z_{SV,i}(t_e) - z_0)^2} \quad (3)$$

Once a time-of-arrival for the signal has been predicted, the actual time-of-arrival of a signalling event from the $j^{th}$ satellite that is closest to that predicted time may be selected as the actual time-of-arrival. Subtracting the predicted time-of-arrival from the actual time-of-arrival gives a single difference residual, which can be converted into an equivalent range residual, through division by the speed of light, c. The single-difference range residual may be defined as follows:

$$\nabla r_{rx,i0} = \nabla R_{rx,i0} - (\hat{D}_i(t_e) - \hat{D}_0(t_e)) + \nabla B_{i0} \quad (4)$$

where:

$\nabla r_{rx,i0}$ is the single difference residual in range, the error arising from errors in the original estimates of GPS time and GPS receiver position;

$\nabla R_{rx,i0}$ is the difference in range between the reference satellite and satellite i as indicated by the times-of-arrival of the signals from those satellites;

$\hat{D}_i(t_e)$ is the estimated distance between the GPS receiver and the reference satellite at the estimated GPS time, $t_e$;

$\hat{D}_0(t_e)$ is the estimated distance between the GPS receiver and satellite i at the estimated GPS time, $t_e$; and $\nabla B_{i0}$ is the (single) difference in the clock biases of the reference satellite and satellite i expressed in terms of distance.

The expression for $\hat{D}_i(t_e)$ can be substituted into equation (4) to give an expression for the single difference residual in terms of the initial estimates of receiver position and absolute time. Using a Taylor Series approximation, limited to the first two terms, and combining together the equations for each non-reference/reference satellite combination, equation (4) can be rewritten as:

$$\begin{vmatrix} \nabla r_{10} \\ \nabla r_{20} \\ \vdots \\ \vdots \\ \nabla r_{n0} \end{vmatrix} = \begin{vmatrix} -\nabla \cos(\alpha_{x1}^0) & -\nabla \cos(\alpha_{y1}^0) & -\nabla \cos(\alpha_{z1}^0) & (\dot{\rho}_1 - \dot{\rho}_0) \\ -\nabla \cos(\alpha_{x2}^0) & -\nabla \cos(\alpha_{y2}^0) & -\nabla \cos(\alpha_{z2}^0) & (\dot{\rho}_2 - \dot{\rho}_0) \\ \vdots & \vdots & & \\ \vdots & \vdots & & \\ -\nabla \cos(\alpha_{xn}^0) & -\nabla \cos(\alpha_{yn}^0) & -\nabla \cos(\alpha_{z2}^0) & (\dot{\rho}_n - \dot{\rho}_0) \end{vmatrix} \cdot \begin{vmatrix} \Delta x \\ \Delta y \\ \Delta z \\ \Delta t \end{vmatrix} \quad (5)$$

Or, more compactly in matrix form, as:

$$\nabla r = \nabla H \cdot \Delta X$$

where $\nabla r_{i0}$ are the single difference residuals for the $i^{th}$ satellite and the reference satellite, expressed in terms of distance;

$\nabla \cos(\alpha_{xi}^0)$, $\nabla \cos(\alpha_{yi}^0)$ and $\nabla \cos(\alpha_{zi}^0)$ are the differences in the direction cosines for the $i^{th}$ satellite and the reference satellite;

$\nabla H$ is defined as the single difference observation matrix, which can be derived from the observation or geometry matrix;

$\dot{\rho}_i$ is the velocity of the $i^{th}$ satellite resolved along the line-of-sight between the receiver and the $i^{th}$ satellite; and $\Delta x$, $\Delta y$, $\Delta z$ and $\Delta t$ are the errors in the originally estimated user position and GPS time.

The equation can be exactly solved with a minimum of four single difference measurements (using five satellites). There is a unique solution which provides corrections to (x, t):

$$\Delta X = \nabla H^{-1} \cdot \nabla r \quad (6)$$

The algorithm above was described on the basis that all signalling events were transmitted at the same absolute time (according to the satellites' clocks). A similar algorithm selects signalling events that were transmitted at different absolute times according to the satellites' clocks. The algorithm is essentially the same as that described above, except that the predicted time-of-arrival for the $i^{th}$ satellite additionally incorporates compensation for the difference in transmission times between the signalling events transmitted by the reference satellite and the $i^{th}$ satellite.

An example of how the single-difference method described above might be implemented in practice is described below. In this example, the location system is a GPS system and the receiver is only capable of decoding the C/A code in the received satellite signals. The signalling events detected by the receiver are code epochs, the time between repetitive signalling events is 1 ms and the receiver is able to determine times-of-arrival of the signalling events that are sub-one-millisecond. This is for the purposes of example only, as the algorithm described below is equally applicable to other satellite navigation systems, to definitions of signalling events other than code epochs, and to scenarios in which the receiver is able to measure a greater or lesser portion of the transit time of the signalling event.

This example of the single-difference algorithm may be explained by first splitting the full time-of-arrival of equation (1) into its integer and fractional components on the left hand side, and using $t_{gps}$ as the time of that the signalling event was transmitted from the satellite:

$$\tau_i + N_i = t_{gps} + \frac{D_i(t_{gps})}{c} + \frac{(B_U - B_{SV,i})}{c} + \frac{(d_{iono,i} + d_{tropo,i})}{c} + \varepsilon_i \qquad (7)$$

$\tau_i$ is the fractional, measured part of the time-of-arrival (sub-one-millisecond) and $N_i$ is the unobserved integer part of the time-of-arrival (an unknown integer number of milliseconds, more generally representing an unknown integer number of code repetition intervals from start of week).

Once again, the reference satellite can be used to set a reference time against which all other satellites are compared. Taking the difference between equation 7 and a reference satellite yields the following equation, noting that the tilde over the $\tau$ terms signifies that these signalling event arrival times are corrected for the satellite clock bias:

$$\tilde{\tau}_i = \tau_i + \frac{B_{SV,i}}{c} \qquad (8)$$

$$(\tilde{\tau}_i - \hat{D}_i(x,t)/c) - (\tilde{\tau}_0 - \hat{D}_0(x,t)/c) = -(N_i - N_0) + (\tilde{\varepsilon}_i - \tilde{\varepsilon}_0)$$

The residual ionospheric and tropospheric errors have been subsumed into the error terms, $\tilde{\varepsilon}$, in equation 8. If estimates of the ionospheric and tropospheric excess delays are available, the signal transit times can be adjusted for this prior knowledge, thereby reducing the error term. All of the terms on the left-hand side of equation (8) are known or can be estimated. The right-hand side of equation (8) is close to an integer millisecond since the errors are small. A modulo operation can be performed on both sides of equation (8) to remove the integer millisecond component as an unknown:

$$|(\tilde{\tau}_i - \hat{D}_i(t)/c) - (\tilde{\tau}_0 - \hat{D}_0(t)/c)|_{mod\ 1ms} = (\tilde{\varepsilon}_i - \tilde{\varepsilon}_0) \qquad (9)$$

Equations 7 through 9 inclusive can be converted from time to distance through multiplication throughout by the speed of light, c. The term $c \cdot \tau_i$ represents the sub-code wavelength part of the distance between the receiver and the $i^{th}$ satellite.

When equation (9) is evaluated with estimated distances, rather than the true distances, correct elimination of the integer term is achieved when (excepting a small region of error due to the effects of noise and multipath represented by c. $(\varepsilon_i - \varepsilon_0)$):

$$|(D_i - \hat{D}_i(x_e, t_e)) - (D_0 - \hat{D}_0(x_e, t_e))| < 0.5\lambda_c \qquad (10)$$

Equation 10 represents a re-organisation of equations 7 and 8 through the replacement of the signalling event transit time by the satellite to receiver distance, $D_i$, $D_0$. In addition, $x_e$ and $t_e$ are the initial estimates of user position and GPS time respectively and $\lambda_c$ is the distance between repetitive signalling events, which is approximately 300 km for GPS C/A code epochs.

The updates to the initial estimates of receiver location and absolute time may once again be computed by means of equation (6). In this version of the algorithm, the vector $\nabla r$ can be formed by first constructing a vector $\Delta t$. The vector $\Delta t$, in units of milliseconds appropriate for C/A code GPS signals, can be constructed as follows:

$$\Delta t_i = 1000 \times [(\tilde{\tau}_i - \hat{D}_i/c) - (\tilde{\tau}_0 - \hat{D}_0/c)] \qquad (11)$$

Assuming GPS satellites, and the signalling events identified by the receiver will be the start of a 1 ms C/A code, $\tilde{\tau}_i$ are the measured, sub-ms portions of the times-of-arrival after correction for the satellite clock bias or biases. The integer part of equation (11) may be removed by performing a modulo 1 ms operation and the result converted into meters.

$$\Delta t_j = \text{mod}(\Delta t_i, 1) \text{ if} \qquad (12)$$

$$(\Delta t_i > 0.5): \Delta t_i = \Delta t_i - 1$$

$$\Delta r_i = \frac{c}{1000}\Delta t_i$$

Once vector $\Delta r_i$ has been constructed equation (6) can be solved to compute the position and time updates.

For both algorithms described above, equation (6) may be straightforwardly solved using standard techniques—for example, equation (13) is used to solve for over-determined least squares systems with uniform weighting:

$$\Delta X = (\nabla H^T \cdot \nabla H)^{-1} \cdot \nabla H^T \cdot \nabla r \qquad (13)$$

Designating one of the satellites as the reference satellite may provide two advantages in the algorithms described above: first, it addresses the issue of integer ambiguity in the measured times-of-arrival; and second, it removes the receiver clock bias as an unknown at the instant of measurement, as the arrival of each signalling event is measured with reference to the arrival of the signalling event from the reference satellite. In this way, the receiver clock bias does not contaminate the measurements and does not enter into the location calculations. The receiver clock is used, however, to provide a timescale for measuring the time differences between the arrival times of the various signalling events; for example, using the intervals between the 'ticks' of the receiver clock to measure time differences.

Unknown Position

Each of the approaches to obtaining a location-fix in the absence of absolute-time described above requires estimates of both absolute time and receiver position to 'seed' the algorithm. If those estimates are sufficiently close to the actual values for absolute time and receiver position then the algorithms will converge on the actual values after a few iterations. If, however, the initial estimates are too far from the actual values, the algorithm will fail. In most scenarios absolute time will be reasonably well-known, either because the receiving device's own clock is sufficiently accurate or because another reasonably accurate time-source is readily available. If extended ephemeris is available, then knowledge of absolute time enables the position of the satellites to be evaluated, but unless full (i.e. unambiguous) pseudo-ranges are available, it is not possible to locate the receiver.

For these approaches to converge on the correct receiver position, the estimated position has typically to be accurate to the order of 50 to 100 km. Often this is achieved by obtaining an initial position from a server. However, there are many situations in which receiver position will be completely unknown. For example, when a user has just got off a aeroplane in a new location, the estimated receiver position could be thousands of miles in error. It would be advantageous to do away with the need for an initial position and require only an approximate time; in other words, to avoid contacting a server while still retaining the ability to get a rapid fix.

U.S. Pat. No. 6,417,801 describes a method in which, if the position of the receiver is completely unknown, the space of all possible a-priori positions is divided into a 100 km by 100 km latitude-longitude grid. Altitude is assigned from a look-up table of topographical altitudes. The process is then iterated across all possible a-priori positions. In effect, this amounts to iterating over the surface of the globe testing each location hypothesis in turn until the correct one is found, through a sequence of unaided elimination. This is an inefficient procedure which does not take into account knowledge which is available to the user's GNSS receiver. As a result, the prior art algorithms require considerable computation effort, too much for practical implementation and using energy, often from a battery source.

There is therefore a need for an improved mechanism for determining the location of a receiver when position is unknown.

SUMMARY OF THE INVENTION

According to a first embodiment of the invention, there is provided an apparatus for determining a location of a receiver by means of signals received by the receiver from a plurality of satellites, the apparatus being configured to: when the receiver has been unable to decode a time-of-transmission from the satellite signals, determine a location for the receiver by means of an algorithm that takes an estimate of the location of the receiver as an input; and when an estimate of the location of the receiver is unavailable, determine an approximate location of the receiver in dependence on the satellite signals and input that approximate location into the algorithm as the estimate of the location of the receiver.

The apparatus may be configured to determine the approximate location of the receiver in dependence on the plurality of satellites from which the receiver receives the signals.

The apparatus may be configured to determine the approximate location of the receiver in dependence on the positions of the plurality of satellites from which the receiver receives the signals.

The apparatus may be configured to determine the approximate location of the receiver in dependence on a region of Earth's surface from which the plurality of satellites are simultaneously visible.

The apparatus may be configured to determine the region of the Earth's surface from which the plurality of satellites are simultaneously visible in dependence on the positions of the plurality of satellites.

The apparatus may be configured to determine a single point on the Earth's surface from which the plurality of satellites are simultaneously visible and to determine the region of the Earth's surface from which the plurality of satellites are simultaneously visible in dependence on that single point.

The apparatus may be configured to determine the single point by determining a resultant of the position vectors of the plurality of satellites and determining the point on the Earth's surface through which the resultant passes.

The apparatus may be configured to determine the single point by determining the points on the Earth's surface through which position vectors of the plurality of satellites pass and determining the centroid of a polygon formed by joining together those points.

The apparatus may be configured to determine the dot products of the point on the Earth's surface through which the resultant passes and the position vectors of each of the plurality of satellites, identify the minimum of the dot products and check that this minimum is consistent with the satellite that generated that dot product being above the horizon.

The apparatus may be configured to determine the dot products of the centroid and the position vectors of each of the plurality of satellites, identify the minimum of the dot products and check that this minimum is consistent with the satellite that generated that dot product being above the horizon.

The apparatus may be configured to select either the point on the Earth's surface through which the resultant passes or the centroid as the single point in dependence on the minimum dot products.

The apparatus may be configured to search a region of the Earth's surface surrounding the single point and to, if a better candidate for the single point is identified by means of that search, replace the single point with that candidate.

The apparatus may be configured to search the region of the Earth's surface surrounding the single point by generating a list of candidate points in that region of the Earth's surface and, for each of the candidate points: determining the dot products between that candidate point and the position vectors of the plurality of satellites; identifying the minimum of the dot products; and if that minimum dot product is larger than the minimum dot product associated with the single point, replacing the single point with the candidate point.

The apparatus may be configured to determine the approximate location of the receiver in dependence on a Doppler effect associated with the signals.

The apparatus may be configured to identify one or more ambiguities associated with a transit time for a signalling event to travel from one of the plurality of satellites to the receiver due to the receiver being unable to decode the time-of-transmission.

The apparatus may be configured to perform one or more cycles of the algorithm and to, for each cycle, input a different one of the identified ambiguities into the algorithm.

The apparatus may be configured to assign a priority to each of the identified ambiguities and to input those ambiguities into the algorithm in priority order.

The apparatus may be configured to, when a cycle of the algorithm successfully generates a location for the receiver, not perform further cycles of the algorithm with the remainder of the identified ambiguities.

According to a second embodiment of the invention, there is provided a method for determining a location of a receiver when the receiver has been unable to decode a time-of-transmission from signals received by the receiver from a plurality of satellites and an estimate of the location of the receiver is unavailable, the method comprising: determining an approximate location of the receiver in dependence on the satellite signals; and inputting that approximate location into an algorithm, which is capable of determining a location for the receiver when the receiver has been unable to decode a time-of-transmission from the satellite signals, as an estimate of the location of the receiver.

According to a third embodiment of the invention, there is provided a computer-readable medium encoded with instructions, that when executed by an apparatus for determining a location of a receiver by means of signals received by the receiver from a plurality of satellites, cause the apparatus to: when the receiver has been unable to decode a time-of-transmission from the satellite signals, determine a location for the receiver by means of an algorithm that takes an estimate of the location of the receiver as an input; and when an estimate of the location of the receiver is unavailable, determine an approximate location of the receiver in dependence on the satellite signals and input that approximate location into the algorithm as the estimate of the location of the receiver.

According to a fourth embodiment of the invention, there is provided an apparatus configured to determine a region of the Earth's surface within which a receiver is located by: identifying a plurality of satellites from which that receiver is receiving signals; and determining a region of the Earth's surface from which it is possible to simultaneously receive signals from the plurality of satellites.

According to a fifth embodiment of the invention, there is provided a method for determining a region of the Earth's surface within which a receiver is located comprising: identifying a plurality of satellites from which that receiver is receiving signals; and determining a region of the Earth's surface from which it is possible to simultaneously receive signals from the plurality of satellites.

According to a sixth embodiment of the invention, there is provided a computer-readable medium encoded with instructions, that when executed by an apparatus configured to determine a region of the Earth's surface within which a receiver is located, cause the apparatus to: Identify a plurality of satellites from which that receiver is receiving signals; and determine a region of the Earth's surface from which it is possible to simultaneously receive signals from the plurality of satellites.

BRIEF DESCRIPTION OF THE DRAWINGS

For a better understanding of the present invention, reference is made by way of example to the following drawings, in which.

DETAILED DESCRIPTION OF THE INVENTION

Figure 1:
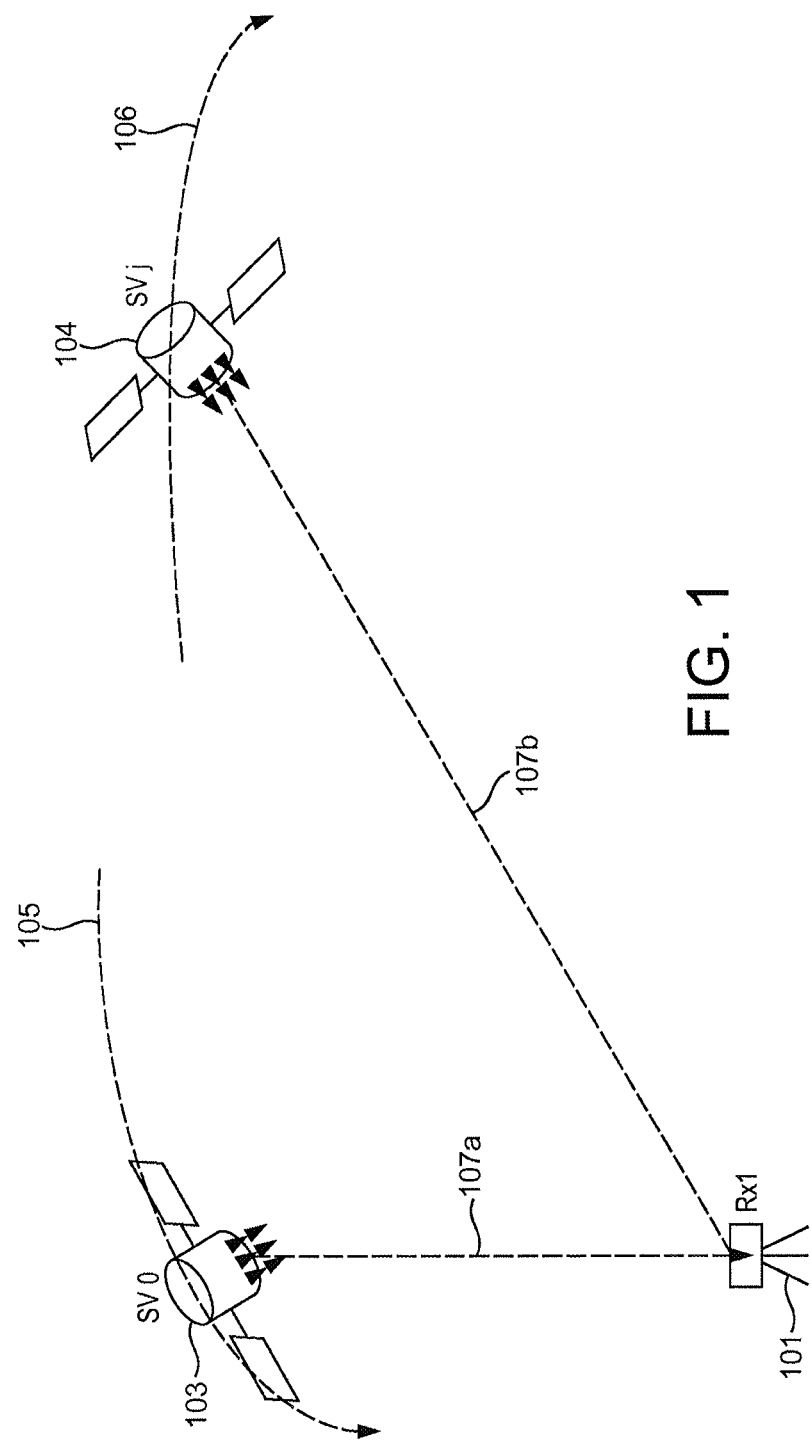
FIG. 1 shows a receiver receiving signals from two satellites.

Assisted GNSS receivers are capable of rapidly obtaining an accurate position fix using approximate time and position assistance. Typically this position assistance has to be accurate on the order of 50 to 100 km. Often, an estimated position of the required accuracy is achieved by obtaining an initial position from a server. One or more embodiments of the invention may do away with the need for an initial position and require only an approximate time. This avoids the need to contact the server while still retaining the ability to get a rapid fix.

An objective of one or more embodiments of the invention is therefore to remove the requirement for an initial receiver position, so that a rapid fix may be obtained anywhere globally from incomplete, i.e. ambiguous pseudo-ranges.

An apparatus may be capable of determining a location of a receiver by means of signals from a plurality of satellites that are received by the receiver. The apparatus may be capable of determining a location for the receiver even when receiver has been unable to decode a time-of-transmission from the satellite signals by means of a specially adapted algorithm, which may generally be termed a TOW-free or sync-free algorithm. Such algorithms typically take an estimate of the location of the receiver as an input. However, there may be some situations where the location of the receiver is completely unknown; for example, when the user has just got off an aeroplane. In such situations, the apparatus may be arranged to first determine an approximate location of the user using information that can be deduced from the satellite signals that the receiver is actually receiving. For example, the set of possible initial locations may be restricted to a small searchable subset of the globe using Doppler measurements, or by means of a visibility horizon associated with the particular constellation of satellites visible to the receiver. This approximate location may then be input into the TOW-free algorithm as the estimated location of the receiver.

One or more embodiments of the invention may be implemented in a satellite navigation or GNSS system, such as GPS, GLONASS, Galileo etc., or a combination of GNSS technologies in a single receiver, where signals from multiple constellations are combined in order to achieve a position solution. Therefore, while one or more embodiments of the invention are described herein specifically in reference to GPS systems, this is for the purpose of example only and it should be understood that the scope of the invention is not limited to GPS systems.

The apparatus for calculating the position of the receiver may include the GNSS receiver or may be located in the same piece of equipment as the receiver (from which the measured components of the transit time can be obtained). Alternatively, the apparatus may be separate from the receiver. For example, the apparatus may be a server. In this scenario the receiver suitably sends the times-of-arrival to the apparatus over a communication link. The apparatus may similarly return to the receiver the result of the location calculation. The communication link may take one of several forms commonly known in the art, such as wireless communication, packet communication, communication over a pager system, internet or other wired form of communication link.

The source of the initial estimate of absolute time is preferably the real time clock (RTC) in the receiver, as it only has to maintain approximate time. Other options include an NTP server or a speaking clock.

Overview

The apparatus and method described herein combine several techniques to address an ambitious problem: obtaining a fix from a satellite navigation system without an initial position using only an estimate of time and ephemeris information.

A first step may be to use Doppler measurements to obtain a coarse estimate of position. In order to limit the errors, this fix may be constrained by constraining the user to be on the Earth's surface with zero vertical velocity. This location solution may provide the input to a second stage, which suitably uses a known TOW-free method such as the single-difference method. A TOW-free method will not typically, on its own, converge from the range of possible errors presented by the Doppler fix. However, the millisecond ambiguity errors are limited in range. The possible ambiguities associated with the initial approximation of position are typically constrained to multiples of +1, 0 and −1 of the code wavelengths with respect to each satellite. It is within the reach of a modern processor to perform multiple cycles of the TOW-free algorithm, with each cycle being performed with respect to a different ambiguity. If N satellites are used in the position determination algorithm, there are only $3^N$ possible ambiguous solutions. Furthermore, some of these are equivalent to each other. The equivalent ambiguities are those that differ only by an additional constant added to all the satellites. This constant is eliminated by the single difference algorithm. Preferably a weighted sampling method is implemented for ordering the ambiguities, for example, by estimates of a priori probability. The least likely ambiguities may be searched last in the process. This may enable the search over possible ambiguities to be terminated early.

In the presence of bit-synchronisation information from all (or possibly only some) of the satellites, it may be possible to obtain a location fix from an acceptable number of possible hypotheses without the requirement for the prior Doppler-based location solution. This is because once bit synchronisation has been achieved, the uncertainty in the time-of-arrival of a particular signalling event at the receiver is ambiguous with respect to the integer 20 ms, rather than 1 ms. As a consequence, there are many fewer possible ambiguities than when bit synchronisation has not been achieved. It may therefore be possible to obtain a location estimate simply by cycling though the possible ambiguities implied by the bit-synchronisation.

The Doppler fix method requires an initial estimate of the position of the receiver to perform the minimisation, but this estimate could be the centre of the Earth, effectively no knowledge of a priori position. Similarly, if bit synchronisation has been achieved, an initial estimate of receiver position will be needed to seed the TOW-free algorithm. A further aspect may provide such an estimate by analysing the positions of the satellites visible to the receiver and deducing from those positions a region of the globe within which the receiver must be located (the prescribed region). This region is bounded by a "visibility horizon". The estimate of location used as the basis for the later stages of the process (whether that is a Doppler fix or a TOW-free location algorithm) may be termed an "interior point" to the prescribed region.

The task of calculating a visibility horizon can be divided into two sections: (i) finding a single point from which all the satellites are visible (an interior point); and (ii) determining a curve which, when crossed, results in at least one visible satellite disappearing over the horizon (the visibility horizon). These processes are described in more detail below.

Figure 2:
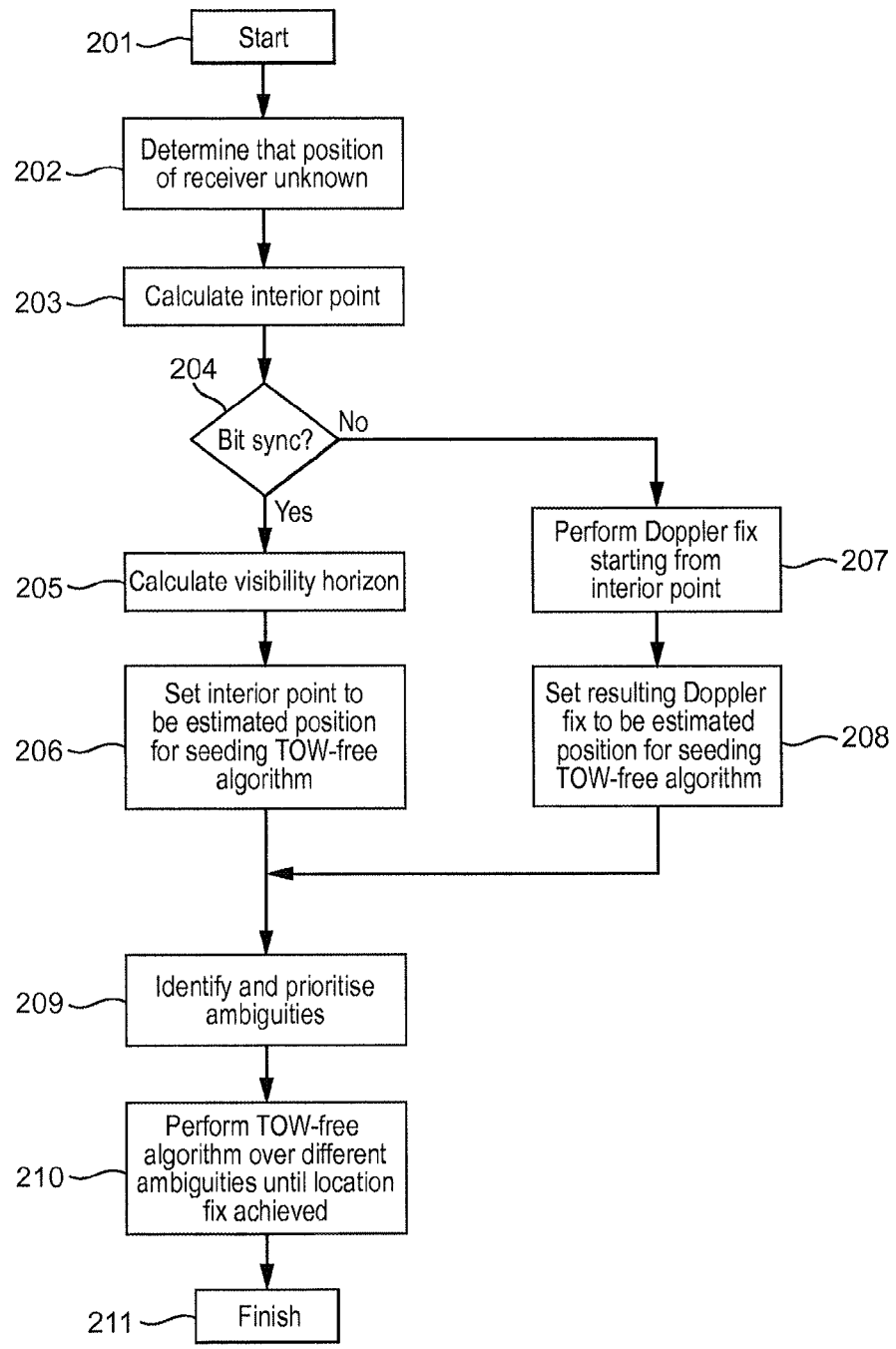
FIG. 2 shows an example of a GNSS system.

An overview of how various techniques may be combined to address the problem of a completely unknown receiver location is shown in FIG. 2. The process commences in step 201. In step 202 the apparatus determines that the position of the receiver is unknown. In step 203 the apparatus calculates an interior point associated with the constellation of satellites visible to the receiver. In step 204 the apparatus determines whether or not the receiver has achieved bit synchronisation with N or more of the satellites.

If bit synchronisation has been achieved on sufficient satellites, there will be fewer ambiguities associated with the pseudo-ranges, with the result that the convergence zone (essentially the error in the initial position of the receiver that the algorithm is able to tolerate) will be larger. This increase in the size of the convergence zone means that the TOW-free algorithm may be able to converge from the interior point, despite the large error likely to be present in that estimate of the receiver position. If it fails to converge then there are a small and enumerable number of possible different ambiguities that will be iterated over. Suitably these ambiguities may be identified using a visibility horizon. The visibility horizon may be calculated in step 205. The interior point may then be set as the estimated position of the receiver for seeding the TOW-free algorithm if bit synchronisation has been achieved (step 206).

If bit synchronisation has not been achieved, a Doppler fix is performed in step 207 to obtain an improved estimate of receiver position. This improved position is then set as the estimated receiver position for seeding the TOW-free algorithm in step 208.

The ambiguities in the pseudo-ranges are identified and prioritised (step 209). If the receiver achieved bit synchronisation these ambiguities will correspond to multiples of 20 ms, whereas if the receiver did not achieve bit synchronisation these ambiguities will correspond to multiples of 1 ms. In step 210 the location algorithm is performed repeatedly until one of the ambiguities produces a location fix. The process terminates in step 211.

Interior Point Identification

The first stage in the overall algorithm is to calculate an interior point (see FIG. 2). The apparatus may be arranged to identify an interior point using an interior point identification algorithm, which is described below and requires a set of satellite positions at an estimated time. The algorithm may incorporate three different methods of determining an interior point, and the apparatus may be arranged to try each of these methods. The three methods are complimentary and together cover essentially all real cases.

The three methods identify:
1. the point on the Earth's surface through which a resultant vector, defined below, to all the visible satellites passes;
2. the centroid of the polygon formed by joining the points on the surface of the Earth through which the vector to each satellite from the centre of the Earth passes; and
3. a local search on the Earth's surface around the better of the first two methods.

Figure 3:
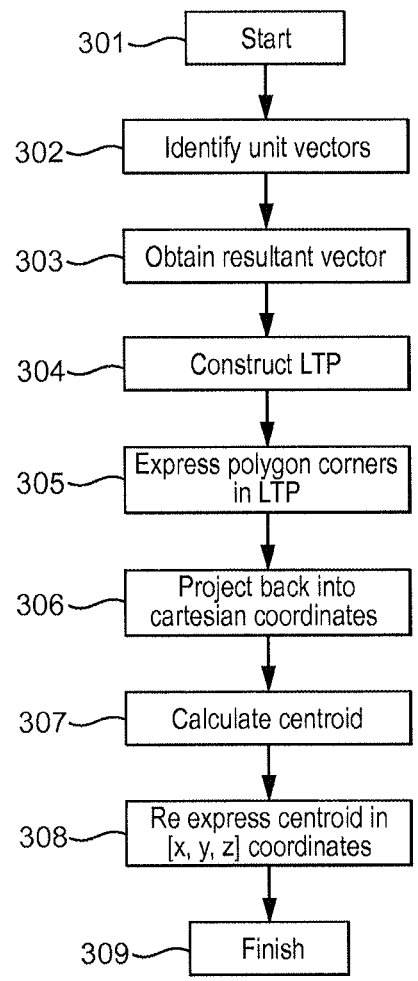
FIG. 3 shows an example of a method for determining resultant and centroid candidates for the interior point.
Figure 4:
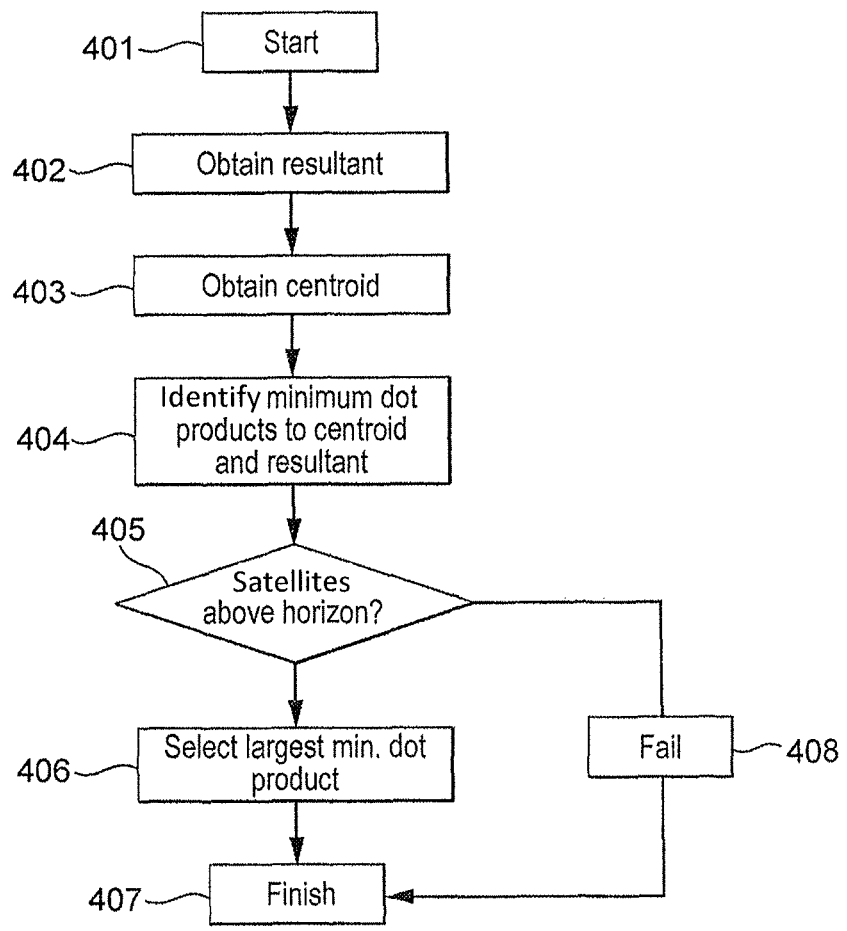
FIG. 4 shows an example of a method for determining the most promising candidate for interior point.
Figure 5:
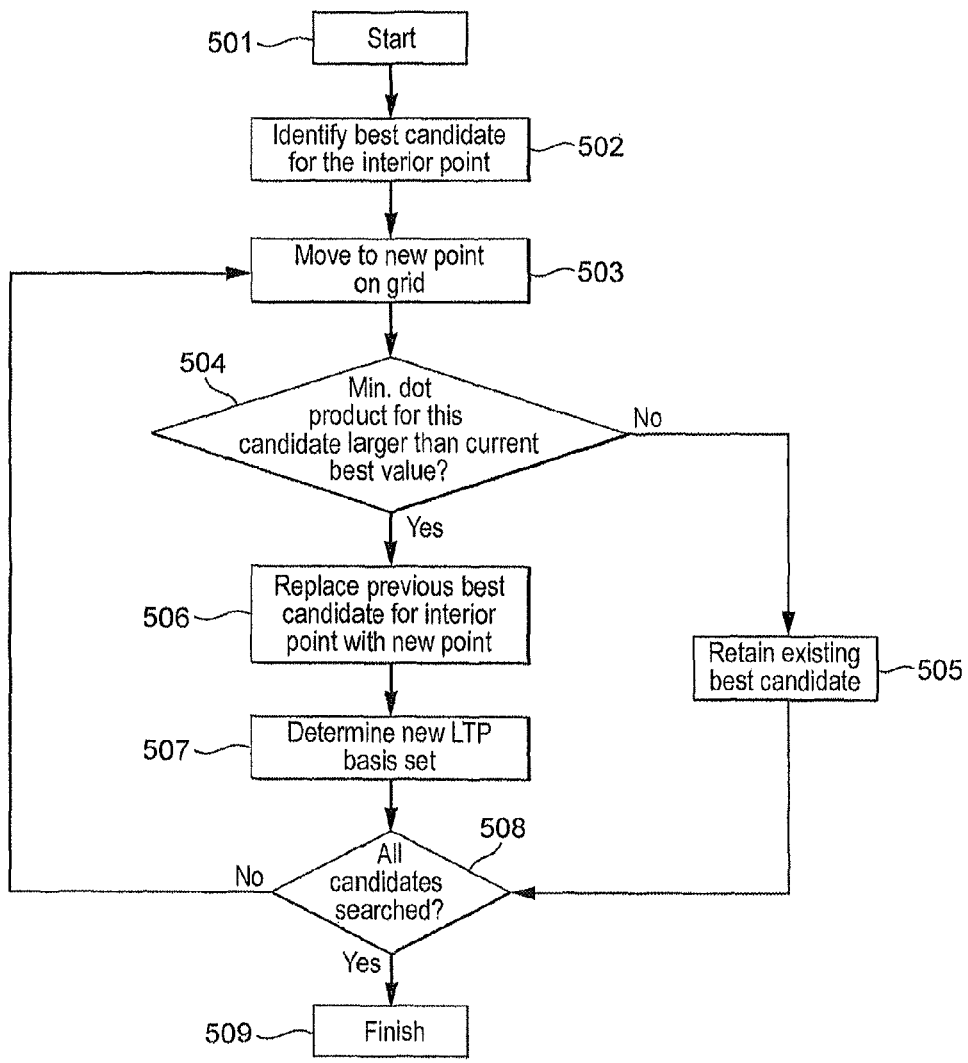
FIG. 5 shows an example of a method for searching for a better interior point.
Figure 6B:
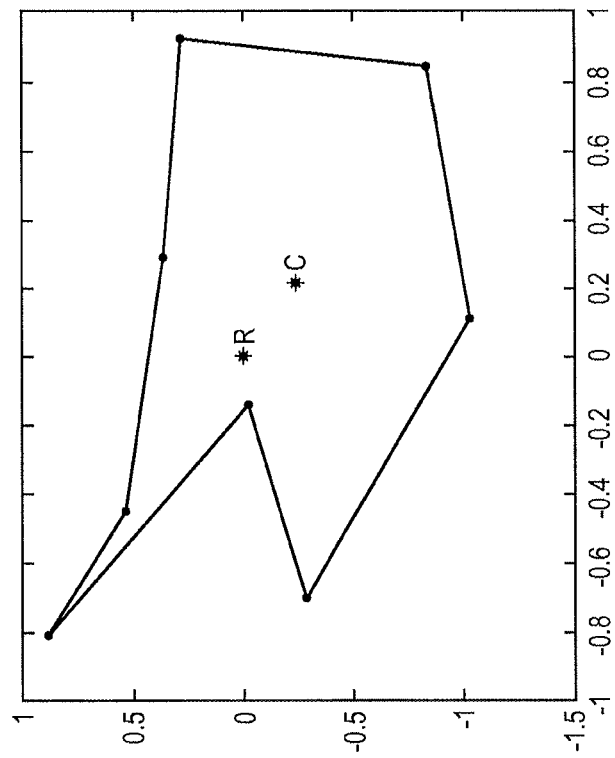
FIGS. 6a and 6b illustrate examples in which the resultant and centroid have failed.
Figure 6A:
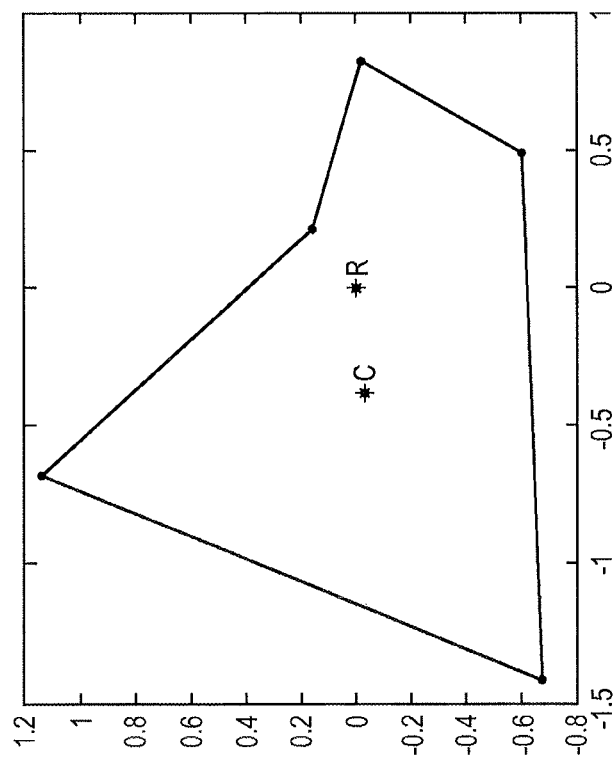

An example of the algorithm is illustrated in FIGS. 3 to 5. FIG. 3 illustrates the stages involved in determining the point on the Earth's surface through which the resultant vector to all the visible satellites passes and the centroid of the polygon formed by joining the points on the surface of the Earth through which the vector to each satellite passes (i.e. points 1 and 2 in the list above). FIG. 4 illustrates a process for determining which of the resultant and the centroid provides the most promising candidate to be the interior point. FIG. 5 illustrates a search method for determining if there are more promising candidates for the interior point. Some examples of interior points are illustrated in FIGS. 6a and 6b.

For convenience, the specific version of the algorithm described below makes use of the unit sphere. The unit sphere is used as a representation of the Earth for the purpose of establishing an initial position. The oblateness of the Earth has little effect on the initial position estimation as accuracies measured in tens of kilometers are only necessary to fall within the 'pull-in' region of more accurate location techniques.

The Earth's radius is normalised to unity for convenience of performing the mathematical derivations.

Figure 11:
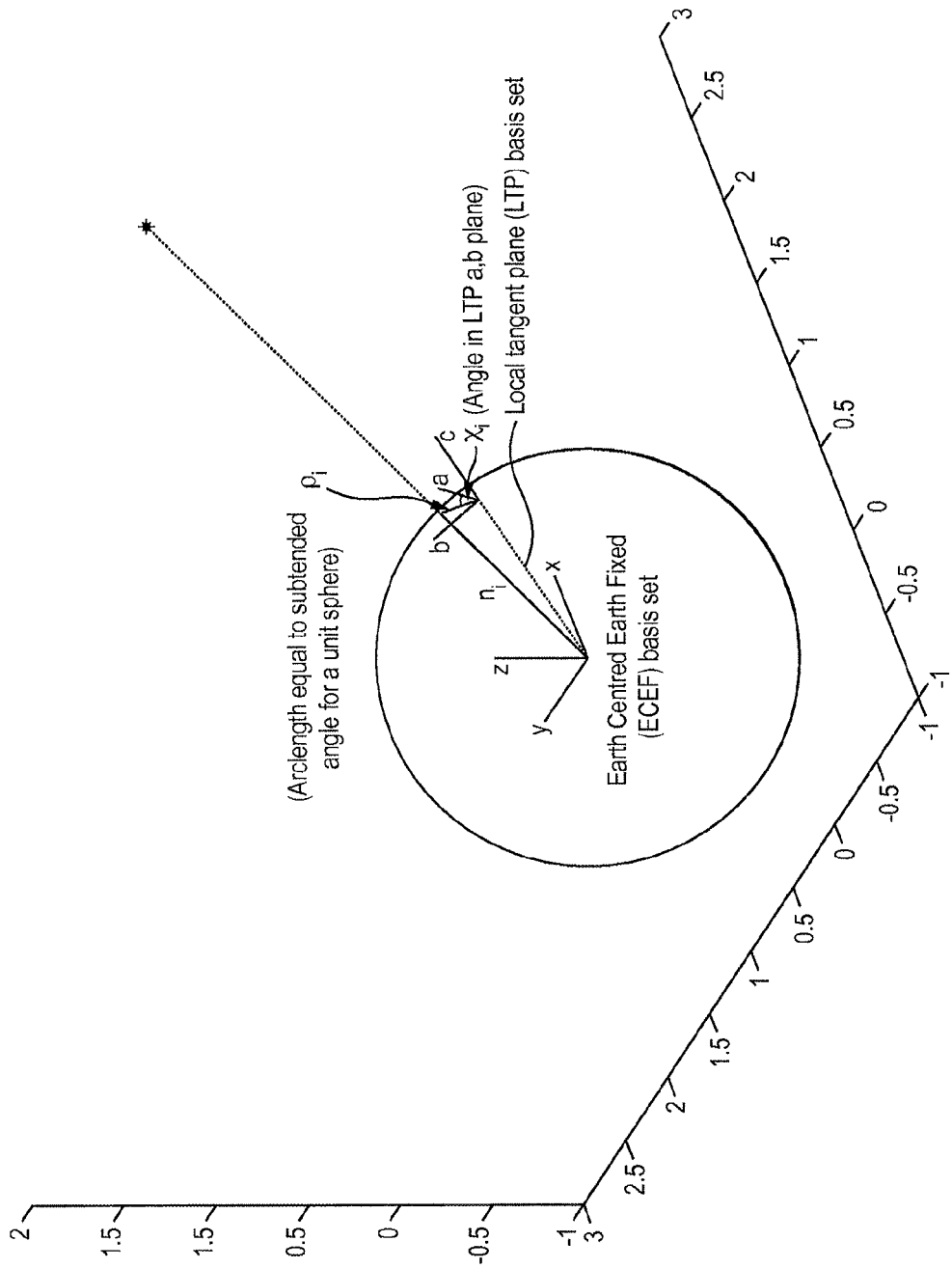
FIG. 11 shows an example of a unit sphere and a local tangent plane.

An example of the Earth represented as a unit sphere is shown in FIG. 11. At the centre of the sphere are shown the [x, y, z] axes of an Earth Centred Earth Fixed (ECEF) basis set. The origin of this ECEF basis set corresponds to the centre of the Earth. The position vector of a satellite is represented by the solid line labelled $n_i$ in the figure. Vector $n_i$ is a unit vector and thus terminates at the point of intersection with the unit sphere. FIG. 11 also shows a local tangent plane (LTP) represented by the [a, b, c] axes. The LTP has its origin at the point of intersection between a resultant vector, k, representing the average of the position vectors to the set of visible satellites. The point of intersection between vector $n_i$ and the unit sphere is located at an angle $\chi_i$ and a distance $\rho_i$ from the origin of the LTP. As a consequence of working on the unit sphere, the length of the arc $\rho_i$ is equal to the angle between unit vectors $n_i$ and k.

The algorithm illustrated in FIG. 3 represents an example of how the centroid of a polygon formed by joining the points on the surface of the Earth through which the vector to each satellite from the centre of the Earth passes. These vectors represent the position of the satellite at the estimated time and may be determined using the ephemeris information. Essentially, this algorithm looks at each of the N satellites in the visible set in turn and identifies where the position vector of that satellite intersects the unit sphere. These locations are initially identified in the LTP by means of a respective angle $\chi_i$ and distance $\rho_i$. The intersection locations are then sorted according to subtended angle ($\rho_i$) and a polygon is formed in which the intersection locations form the corners. The polygon is then projected back into Cartesian coordinates, its centroid is identified, and the centroid re-expressed in ECEF coordinates. The algorithm will now be described in more detail with reference to FIG. 3.

The process illustrated in FIG. 3 commences in step 301. The first part of the process identifies the unit normal vectors to all the satellites, $n_i$ (step 302). These vectors are summed and normalized to yield the resultant vector, k (step 303). The resultant vector may be thought of as the average of the vectors to each of the visible satellites (perhaps with an elevation mask) and is defined as:

$$N = \sum_i n_i \qquad (14)$$

$$k = \frac{N}{|N|}$$

The vector k has a norm of unity and, therefore, lies on the unit sphere. The next part of the process is to construct a local tangent plane (LTP) which is an orthonormal basis set on the surface of the sphere with the point defined by k as the origin (step 304). The local basis set may be defined as:

$$K = \sqrt{k_x^2 + k_y^2}$$

$$a = [-k_y, k_x, 0]/K$$

$$b = [-k_x k_z, -k_y k_z, K^2]/K$$

$$c = [k_x, k_y, k_z]/K \qquad (15)$$

A polygon is defined where the lines of sight vectors, $n_i$, from each satellite to the Earth's centre cross the Earth's surface which is approximated by the local tangent plane defined above. The general geometric arrangement is shown in FIG. 11. In step 305, the polygon corners are expressed using the local tangent plane basis set.

Preferably polar coordinates are used to preserve distances on the Earth's surface:

$$\rho_i = \cos^{-1}(k \cdot n_i)$$

$$n_a = (n_i - k) \cdot a$$

$$n_b = (n_i - k) \cdot b$$

$$\chi_i = \tan^{-1}(n_b/n_a) \qquad (16)$$

where $(k \cdot n_i)$ represents the inner product of the vectors k and $n_i$.

In the equations above, the norms of each vector, k and n, are, by definition, unity.

The apparatus may be arranged to perform the trignometric inversions using look up tables for a fast firmware implementation. The arctangent is preferably defined over 0 to $2\pi$.

The corners of the polygon on the unit sphere may be sorted by ascending values of the angle $\chi_i$, counterclockwise from the reference direction, which is east. This produces a table of the adjacent corners of the polygon. Each corner subtends an angle $\rho_i$ at the centre of the Earth. This is related to the distance from the origin of the LTP to the polygon corner. Finally, the final point of the polygon, $\chi_{N+1}$ is the same as the initial point and is constructed by adding $2\pi$ to the angle of the first point:

$$\chi_{N+1} = \chi_1 + 2\pi \qquad (17)$$

This closes the polygon.

The centroid may be more straightforward to identify in two-dimensions. The algorithm may therefore project back into Cartesian coordinates to produce a 2D polygon, with the distances from origin on the sphere preserved (step 306). The distance between the origin and any of the polygon corners is $\|r\| \cdot \rho_i$, where the norm of the radius, r, is unity. The coordinates in the ab plane of the polygon corners corresponding to satellite i are given by:

$$p_{a,i} = \rho_i \cos(\chi_i)$$

$$p_{b,i} = \rho_i \sin(\chi_i) \qquad (18)$$

The centroid of the polygon may be calculated using well-known Meister/Gauss formulae (step 307), where A is the area of the polygon and $u_a$ and $u_b$ are the coordinates of the centroid:

$$A = \frac{1}{2} \sum_i p_{a,i} p_{b,i+1} - p_{a,i+1} p_{b,i} \qquad (19)$$

$$u_a = \frac{1}{6A} \sum_i (p_{a,i} + p_{a,i+1})(p_{a,i} p_{b,i+1} - p_{a,i+1} p_{b,i})$$

$$u_b = \frac{1}{6A} \sum_i (p_{b,i} + p_{b,i+1})(p_{a,i} p_{b,i+1} - p_{a,i+1} p_{b,i})$$

Finally, the algorithm may re-express the centroid position in x,y,z coordinates (step 308). (If the equation for $\theta$ is slightly unintuitive recall that on the unit sphere arc distance is equal to subtended angle.) The formulation below ensures that the resultant point is a unit vector.

$$\theta = \sqrt{u_a^2 + u_b^2}$$

$$u = (u_a a + u_b b)/\theta$$

$$d = \cos(\theta)k + \sin(\theta)u \qquad (20)$$

The outcome of the algorithm illustrated in FIG. 3 is two candidates for the interior point, both in [x, y, z] coordinates. The apparatus may be arranged to test these candidates to check if either meets the criterion of having all the satellites visible from it. This process is illustrated in FIG. 4.

The process commences in step 401. First the algorithm obtains the resultant and centroid candidates, e.g. by the process illustrated in FIG. 3 and described above (steps 402 and 403). The algorithm then identifies the satellites with the minimum dot products to each of the two candidates (step 404):

$$\Delta_k = \min_i (k \cdot n_i)$$

$$\Delta_d = \min_i (d \cdot n_i) \qquad (21)$$

The algorithm then checks whether these minimums are consistent with the satellite being above the horizon by comparing them with:

$$\phi_{min} = R_e/\overline{R}_i \quad (22)$$

where $R_e$ is the Earths radius and $\overline{R}_i$ is the average distance to the visible satellites from the center of the Earth. The value of $R_e/\overline{R}_i$ may be considered as the cosine of half the plane angle subtended at the centre of the earth by the local tangent plane. Consequently, any satellite generating a value of $\Delta_k$ or $\Delta_d$ having a lower value than $R_e/\overline{R}_i$ must be below the horizon. This process is performed in step 405.

If any of the satellites are below the horizon, the process fails (step 408). However, if the minimums are consistent with the satellite being above the horizon, the largest minimum dot product is chosen as the interior point (step 406). The process then finishes in step 407.

If the process fails, a minimum elevation angle mask of $\delta$ may be used to select a reduced group of satellites. This corresponds to a value of $\phi$ larger than that in equation (22). The reduced group of satellites may be selected based on the following constraints:

$$i \in \{(k \cdot n_i) > \phi_{min} + \delta\} \text{ or}$$

$$i \in \{(d \cdot n_i) > \phi_{min} + \delta\} \quad (23)$$

The interior point candidates k and d may have to be iteratively determined as the number of satellites is reduced.

An alternative is for the satellite associated with the minimum value of $\Delta_k$ or $\Delta_d$, and which is less than $\phi_{min}$, to be eliminated and the process repeated.

Around 99% of the time the processes described above will suffice. However, it may be worthwhile to provide the apparatus with a third option as there may be some cases where both the resultant and the centroid fail. It may also be worthwhile further improving on the estimated points.

Failures tend to occur when there are several satellites very close to the horizon. The shape of the resulting polygons, containing the receiver's position, are very narrow. The resultant and the centroid points lie outside this region. Even when the algorithm does not fail, it is preferable if an interior point does not lie close to an edge of the visibility horizon. This is both because being more central reduces scope for ambiguities and also because it improves the worst case linearized parameters. Another important reason is that when calculating visibility zone points (described below), curves represented by points spaced by around 30 km are used. When the receiver lies within a few km of the visibility zone line, consecutive points subtend a large angle which can result in numerical problems. The following method may avoid these issues.

A suitable search process is illustrated in FIG. 5. The process starts at step 501. First the best of the resultant and centroid points are identified (step 502). The aim is to perform a local search on the surface of the globe around the best of the resultant and centroid points. This may be achieved by using a grid to structure the search. It may be computationally efficient to organize the grid in polar coordinates but to increase the density of azimuthal points as the search moves radially outwards, to keep the spacing roughly constant. A radial grid of 100 km spacing (i.e. 100/6400 on the unit sphere) and an azimuthal density of 1/n radians has been found to be appropriate. The inner circle of the radial grid may be indexed by n=1, the next circle by n=2 and so on. At step 503, the algorithm moves to the next point on the grid to be tested. The minimum dot product to any of the satellites, a surrogate for distance to the nearest zone edge, is then tested to see if it is larger than the value at the current best point (step 504). If it is, the algorithm selects the point at the new best candidate for the interior point (step 506). Otherwise, the previous best candidate is retained (step 505). If the centroid is the best point (as it often is) then a new LTP basis set needs to be derived using equation (15) with the centroid serving as the new k (step 507).

The search is continued for a predetermined radius beyond the point at which the first interior point is found (step 508). A suitable radius might be 400 km. The process terminates once that predetermined radius has been reached (step 509).

For 99% of cases the apparatus typically searches 38 points covering a radius of 400 km (around 0.1% of the Earth's surface). The apparatus may continue the search out to a radius of 4000 km requiring approximately 4000 evaluations in the worst case although only in 0.05% of cases are more than 2000 evaluations required. Such a series of computations can be completed in a short period on a modern processor.

An implicit assumption in the methods described above is that absolute time is accurate enough that there exists a point on the Earth surface from which the observed satellites are visible. If this is not the case, the algorithm will fail.

FIGS. 6a and 6b illustrate satellite polygons in the local tangent plane with the resultant at the origin for an example in which the centroid has provided a successful solution but the resultant has not (FIG. 6a) and vice-versa (FIG. 6b). This shows that the two methods have different pathologies. The resultant method fails when there are many satellites clustered in one part of the sky. This tends to align the resultant with the majority at the expense of reducing the influence of the other satellites which then fall below the visibility horizon. The centroid method on the other hand tends to fail when the visibility region is a narrow needle with small area. This can occur when a low elevation satellite is sandwiched between two higher elevation satellites.

Visibility Horizon

Having determined an interior point, the apparatus may be configured to next calculate the visibility horizon. The visibility horizon is the line surrounding the region on the Earth's surface from which all the currently observed satellites are simultaneously visible. When this line is crossed one of the observed satellites will drop below the horizon. The algorithm for determining the visibility horizon may require the interior point and the satellite positions as input.

Figure 7:
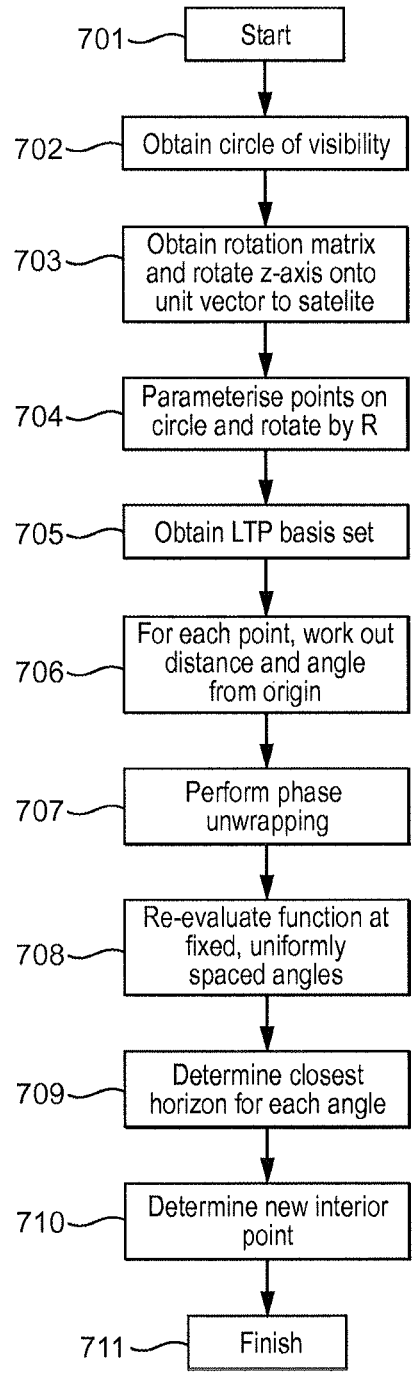
FIG. 7 shows an example of a method for determining a visibility horizon.
Figure 8:
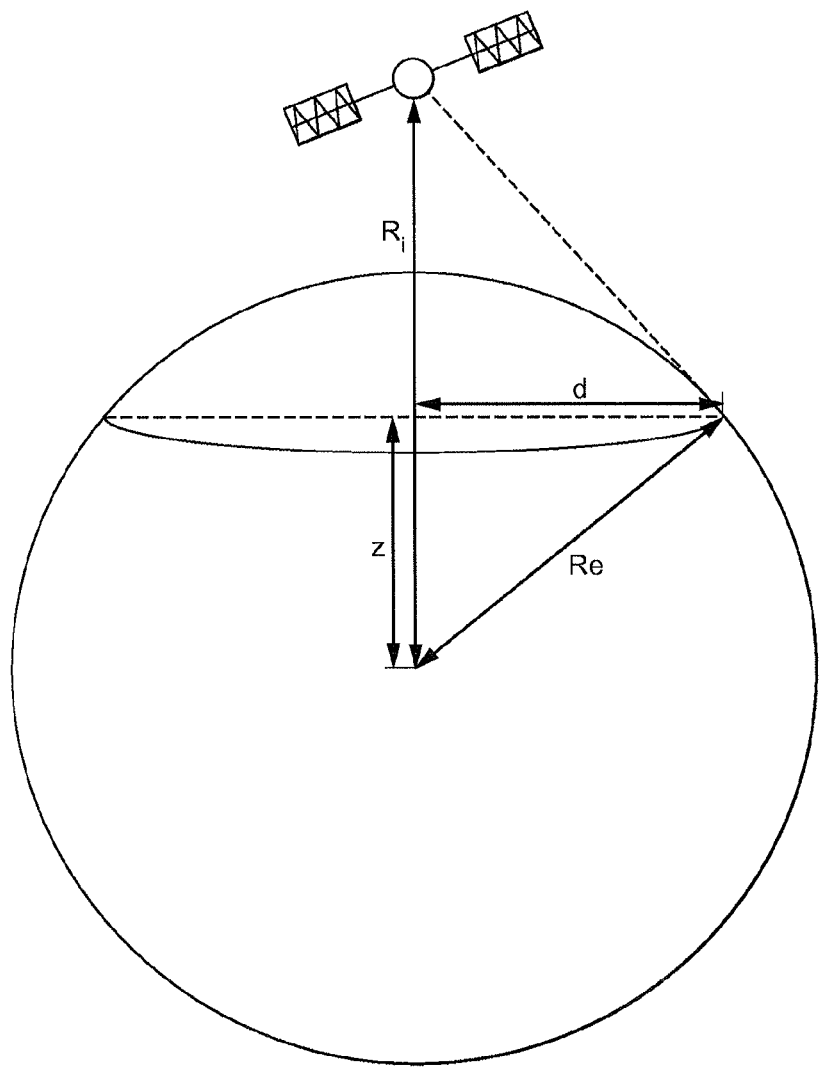
FIG. 8 shows illustration of a visibility circle for a satellite.

An example of an algorithm for determining a visibility horizon is illustrated in FIG. 7. The process commences in step 701. The first part of the process is to take each satellite in turn and, for mathematical convenience, treat it as if it were directly above the North Pole. In this hypothetical case it is straightforward to obtain the height and radius of the circle of visibility (step 702), which is at constant latitude. The satellite is visible from all points with latitudes greater than that at the circle visibility. From elementary geometry:

$$\rho_i = R_e / R_i$$

$$z = R_e \rho_i$$

$$d = R_e \sqrt{1 - \rho_i^2} \quad (24)$$

Where $R_e$ and $R_i$ represent the Earth and satellite radius respectively and z and d define the height and radius of the circle of visibility (the satellite is directed along the z axis). This arrangement is illustrated in FIG. 8.

Having treated the satellite as though it were positioned above the North Pole for convenience, the next stage is to rotate the circle of visibility to reflect the actual position of the satellite relative to the Earth. Therefore, the next step (step 703) is to obtain the rotation matrix R that takes the z axis and rotates it onto $n_i$, which is the unit vector from the centre of the Earth to satellite i:

$$\cos(\theta) = n_{i,z} \quad (25)$$
$$\sin(\theta) = \sqrt{n_{i,x}^2 + n_{i,y}^2}$$
$$\cos(\phi) = n_{i,x}/\sin(\theta)$$
$$\sin(\phi) = n_{i,y}/\sin(\theta)$$

$$R = \begin{bmatrix} \cos(\phi)\cos(\theta) & -\sin(\phi) & \cos(\phi)\sin(\theta) \\ \sin(\phi)\cos(\theta) & \cos(\phi) & \sin(\phi)\sin(\theta) \\ -\sin(\theta) & 0 & \cos(\theta) \end{bmatrix}$$

In the next step (step 704), a set of points is parameterised on the circle according to α. Suitably the points may be spaced by 1 degree. A spacing of 1 degree corresponds to points separated by around 30 km on the Earth's surface. It may be unnecessary to space the points this closely. However, a reasonably high point density is important. It is preferably to work on the unit sphere and so equation (24) may also be divided by $R_e$. Each point in the locus is given by:

$$r = [d \cos \alpha, d \sin \alpha, z]/R_e \quad (26)$$

Each point is rotated by R. This represents 360 matrix multiplies. If each multiply requires, say, 100 instructions the total execution time should be less than 0.5 ms per satellite on a typical processor.

At this stage in the algorithm, the apparatus has generated a set of 3D visibility loci for the observed satellites. The next step in the algorithm is to obtain an LTP basis set based around the interior point at the origin (step 705). This LTP basis set may be derived in the same manner indicated by equation (15). As before, this orthonormal basis set may be denoted by the vectors [a,b,c](as shown in FIG. 11).

The next step in the algorithm is, for each of the 3D visibility loci, to work out the distance (r) and angle (χ) of that loci from the origin (step 706). This may be achieved using the method of equation (16). Preferably the instruction count in this loop is kept to less than 100 instructions, which may require a combination of Taylor series expansions and look up tables.

A phase unwrapping is preferably performed to ensure there are no major discontinuities in χ moving along the locus (step 707). At this point, the algorithm has generated a function r(χ) that is sampled at a set of discrete and non-uniformly spaced angles $χ_k$. The next stage of the algorithm uses linear interpolation to re-evaluate this function r(χ) at a set of fixed and uniformly spaced angles γ (step 708). A suitable spacing of for this point set might again be 1 degree. At the completion of step 708, the apparatus will have generated a set of visibility loci from all the satellites expressed at a common set of angles in the local tangent plane.

The final stage of the algorithm iterates over γ and to determine the closest horizon line for each angle (step 709). This envelope defines the visibility curve. It may also be worthwhile to work out a new interior point at the middle of the visibility zone (step 710). The new interior point may be defined as:

$$[\mu_x, \mu_y] = \frac{1}{N}\sum_n V(\gamma)[\cos(\gamma), \sin(\gamma)] \quad (27)$$

where V(γ) is the visibility horizon.

The step of working out a new interior point may require that the visibility horizon be re-expressed with respect to this new origin. Although the instructions required to implement such a process should not add significantly to the overall processing burden, this step will add another layer of complexity and may not be implemented. Overall the algorithm is quite intensive but if well written should be able to execute under 10 ms on a typical 80 MHz processor. A simple optimization of reducing the density of angular points is also available if the algorithm is proving too intensive.

Figure 9B:
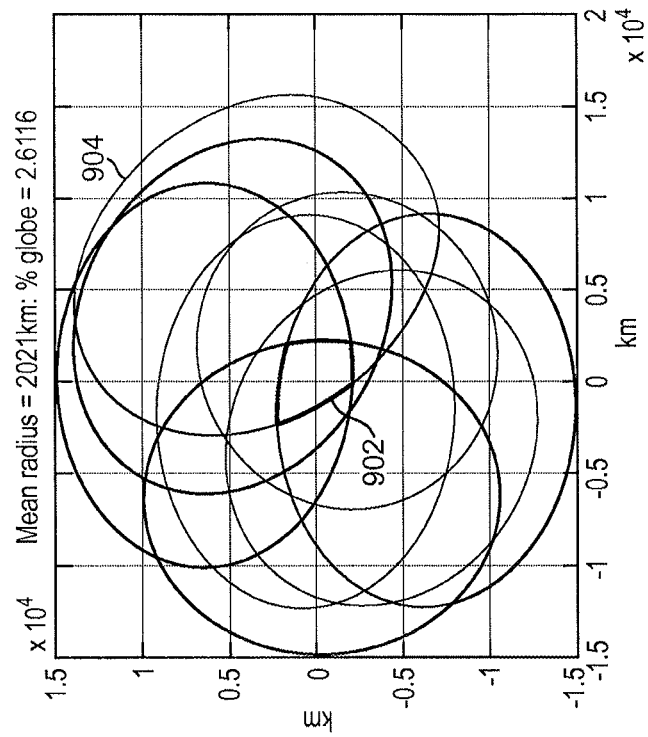
FIGS. 9a and 9b show examples of visibility horizons.
Figure 9A:
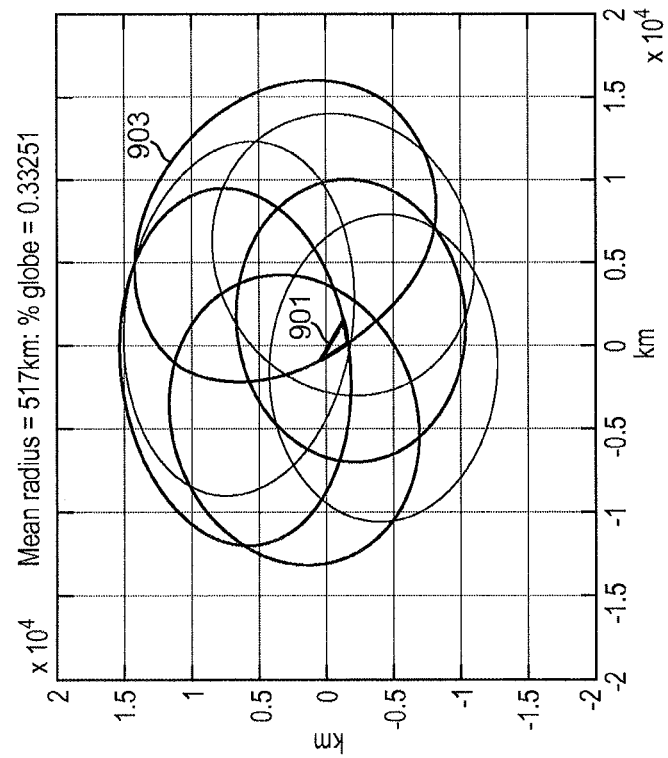

In the majority of cases, the visibility zone is a small fraction of the globe's surface. Some example visibility zones are shown in FIGS. 9a and 9b. In both cases eight satellites are visible. The horizons are shown at 901 and 902. The horizons from the individual satellites are circles (see e.g. 903 and 904). In FIG. 9a, the potential area has been restricted to 0.33% of the globe's surface. In FIG. 9b, the potential area has been restricted to 2.6% of the globe's surface.

Doppler Fix

If the receiver has been able to achieve bit synchronisation with all or some of the satellites, it may be possible to use the interior point calculated by means of the algorithms described above as the initial position of the receiver in a TOW-free location algorithm such as the single-difference method. If, however, the receiver has not been able to achieve bit synchronisation, the interior point will be insufficiently accurate to serve as a starting point for receiver position given the ambiguities in the pseudo-ranges. Therefore, to deal with scenarios in which the receiver has not achieved bit synchronisation with the satellite signals, the apparatus may be configured to make use of Doppler information to refine the estimated receiver position (to within acceptable bounds).

The observed satellite frequencies relative to the down-converted frequency depend on the frequency of transmission, the relative velocity of the satellite and the receiver projected onto the line-of-sight between the receiver and the satellite, and the frequency error of the receiver's local clock. The observed satellite frequencies may therefore be modelled by:

$$f = \kappa(V_i - v)\cdot s_i - C_d + \beta_i + \epsilon_i \quad (28)$$

Where the constant κ is 5.2550 (κ is the reciprocal of the wavelength of the carrier expressed in m$^{-1}$) and is the ratio of the GPS transmission frequency (1575.42 MHz) to the speed of light (2.99792E8 m/s), $V_i$ is the velocity of the i$^{th}$ satellite, v is the receiver velocity, $s_i$ is the unit vector from the receiver to the i$^{th}$ satellite, $C_d$ is the local clock frequency error and JP is the satellite frequency transmission error. $\epsilon_i$ represents measurement noise on the observations.

Figure 10:
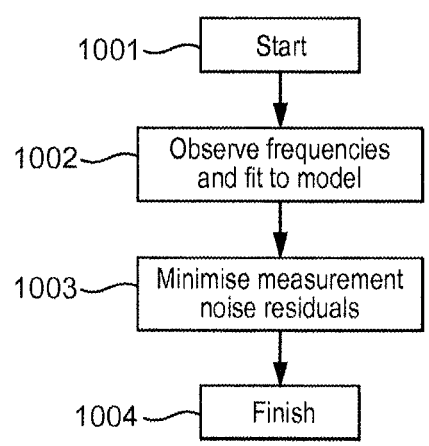
FIG. 10 shows an example of a Doppler fix method.

An overview of a suitable Doppler algorithm is shown in FIG. 10. The algorithm commences in step 1001. In a first stage, a set of frequencies is observed and fitted to the model (equation 28) in a least squares sense (step 1002).

This is achieved by substituting equation (13) and minimising the sum of the squares of the unknown measurement errors with the following objective function (step 1003):

$$E = \sum_i \left(\hat{f}_i(x_{rec}, v, t_{abs}, C_d) - f_i\right)^2 = \sum_i (\kappa(V_i - v) \cdot s_i - C_d + \beta_i - f_i)^2 \quad (29)$$

The free variables in this minimization are receiver position $x_{rec}$, receiver velocity v, absolute time $t_{abs}$ and local clock error $C_d$ so this provides a method for determining receiver position from frequency (Doppler) observations. This minimisation may be performed directly or by local linearization and iteration. The latter technique may involve expanding $\hat{f}$ as a Taylor series about an estimated position and absolute time.

Linearization and Iteration

The problem is now a classic least squares inverse problem with the corresponding linear equation:

$$Jx = \delta r \quad (30)$$

The $i^{th}$ row of the Jacobian matrix J contains elements which are the partial derivatives with respect to each of the free variables for the $i^{th}$ satellite. The derivatives are evaluated at the estimated position and absolute time. The right-hand side of equation (30) represents the model errors. For the $i^{th}$ component of the model, the errors may be represented as:

$$\delta r = (f_i - \hat{f}_i^0) \quad (31)$$

The partial derivatives that form the rows of the Jacobian matrix may, for convenience, be denoted as follows:

$$J_{i,x_{rec,x}} = \left.\frac{\partial \hat{f}_i}{\partial x_{rec,x}}\right| \quad (32)$$

where equation (32) represents the specific example of the partial derivative of frequency with respect to the x-component of the receiver position vector.

The line of sight unit vector between the receiver and the $i^{th}$ satellite may be denoted by:

$$s_i = \frac{x_{sat,i}(t_{abs}) - x_{rec}}{|x_{sat,i}(t_{abs}) - x_{rec}|} \quad (33)$$

where $x_{sat,i}(t_{abs})$ represents the position vector of the $i^{th}$ satellite at absolute time $t_{abs}$ relative to the centre of the Earth. For convenience, the following variable may be defined:

$$B_i = \frac{V(t_{abs})_i - v}{|x_{sat,i}(t_{abs}) - x_{rec}|} \quad (34)$$

This leads to the following equations for the partial derivatives that make up the Jacobian:

$$J_{i,x_{rec,x}} = \kappa[(B_i \cdot s_i)s_{i,x} - B_{i,x}]$$

$$J_{i,v_x} = -\kappa s_{i,x}$$

$$J_{i,c_d} = -1$$

$$J_{i,t_{abs}} = \kappa[B_i \cdot V_i - (B_i \cdot s_i)(V_i \cdot s_i) + \dot{V} \cdot s_i] + \dot{\beta} \quad (35)$$

Where there are corresponding equations in respect of $x_{rec,y}$ and $x_{rec,z}$, and $v_y$ and $v_z$. $\dot{V}$ and $\dot{\beta}_i$ represent the acceleration of satellite i and the clock acceleration satellite i respectively.

The full Jacobian has 8 variables. However it is not always feasible or prudent to attempt to solve for all 8 free variables, either because we have too few observations or because they are known (i.e. their uncertainty is small compared to their potential errors after fitting). The main potentially useful constraints are to assume:

$t_{abs}$ is known
altitude is fixed
receiver velocity v is zero
the vertical component of receiver velocity v is zero Two methods can be used to apply these constraints. Either the fixed components can be omitted completely from the list of free variables or the constraint can be treated as introducing a quadratic penalty term into the energy expression of equation (29). After differentiation, this penalty term is equivalent to an extra observation.

The constraints for altitude and vertical user velocity are straightforward if the position and velocity in the Jacobian are expressed in the local tangent plane. Expressing the altitude constraint in the LTP is an approximation as the constraint is really to lie on the surface of a sphere rather than on a plane. A 100 km error introduces a 1.5 km altitude error due to this approximation. To avoid introducing this altitude error, the resultant position may be re-projected onto the Earth after every iteration. The LTP basis is also convenient for calculation of the dilution of precision (DOP). The following method may be used to obtain an LTP basis set (see also equation 15):

$$c = \frac{x_e}{|x_e|} \quad (36)$$

$$C = \sqrt{c_x^2 + c_y^2}$$

$$a = [-c_y \quad c_x \quad 0]/C$$

$$b = [-c_z c_x \quad -c_z c_y \quad C^2]/C$$

$$\Theta = \begin{bmatrix} a_x & a_y & a_z \\ b_x & b_y & b_z \\ c_x & c_y & c_z \end{bmatrix}$$

where $x_e$ is the initial estimate of receiver position, a,b,c form an orthonormal set and $\Theta$ is a rotation matrix. In the construction of the Jacobian, vectors $B_i$, $s_i$ and $V_i$ may be expressed in the LTP basis by applying $\Theta$. Note that we now refer to the columns of the Jacobian in terms of the axes [a,b,c] rather than [x,y,z] as previously. The constraints are then applied by the inclusion of additional observations as follows:

gps time $\Rightarrow J_{k,t_{abs}} = W_{t_{abs}}, \delta r_k = 0$ altitude $\Rightarrow J_{k,x_{rec,c}} = W_{x_{rec,c}}, \delta r_k = 0$ user velocity $\Rightarrow J_{k,v_a} = W_{v_a}, \delta r_k = 0, [a,b,c]$ user vertical velocity $\Rightarrow J_{k,v_c} = W_{v_c}, \delta r_k = 0$ Equation (37) represents additional rows that are added to the bottom of matrix J in equation (30). K represents the row number, the constants W denote the weighting applied to each constraint and $\delta r$ represents an element of the error vector on the right-hand side of equation (30). [a, b, c] in the third line of equation (37) denotes that there are three rows added to the matrix for the user velocity: one for each axis of t LTP basis set.

In this way by adjusting the weights of the constraining observations we can adjust the tightness with which the constraint is enforced. For example for the altitude constraint a value of W of one implies that a 1 m height error has the same impact on the cost function as a 1 Hz Doppler residual. Once solved, the solution vector is still expressed in LTP. To return the solution vector to [x,y,z] coordinates, the position and velocity may be rotated using $\Theta^T$. Conveniently, by working in LTP, the squared elements of DOP are the diagonal elements of the inverse Hessian ($H_{ii}^{-1}$) so that HDOP, for example, is simply $$HDOP = \sqrt{H_{11}^{-1} + H_{22}^{-1}} \quad (38)$$

The initial starting point for the minimisation might suitably be an interior point from which all the observed satellites are visible (as described above). This corresponds to the use of the interior point as the initial estimate of the position of the receiver.

For the linearized Doppler fix method, four iterations are recommended with the absolute time estimate being updated after only the first iteration. It is also recommended that the usual post calculation checks on altitude, residuals and HDOP be performed for the Doppler fix but with a high degree of tolerance for large errors. For example we permit altitude estimates as large as 500 km, residual errors as large as 500 km, and HDOP values as large at 10000. Subsequent to these checks the resultant position should be projected onto the Earth's surface. This may be achieved using the formula: $r_0 = r_e \hat{r}||\hat{r}|$, where $\hat{r}$ is the estimated receiver position, $r_0$ is the estimated receiver position projected onto the Earth's surface and $r_e$ is the radius of the Earth. The projection method thus shrinks the estimated position of the receiver along its vector from the centre of the Earth until it reaches the Earth's surface]. The projected position may serve as the starting point for a TOW-free location calculation.

TOW-Free Processing

As is apparent from FIG. 2, the next stage in the process after a suitable estimate of receiver position has been obtained is to perform a TOW-free location algorithm using the receiver position as a starting point for the algorithm. There are many examples of TOW-free algorithms (for example, the "single-difference" method and the methods described in the Peterson, Lannelongue and van Diggelen references referred to in the introduction). An apparatus according to an embodiment of the invention may be configured to use any suitable TOW-free algorithm for calculating a location for the receiver. The apparatus may also be configured to obtain an improved estimate of absolute time by means of the TOW-free algorithm.

The likelihood of obtaining a location-fix for the receiver may be further improved by repeating the TOW-free location algorithm over different ambiguity possibilities. Some examples of how these ambiguity possibilities might be identified are described below, followed by an explanation of how the single-difference method, in particular, might be adapted to iterate over the different ambiguity possibilities.

Ambiguity Enumeration

One possibility for expanding the search is to enumerate the possible ambiguities and systematically search them rather than trying different estimated positions on the surface of the globe and hoping that one will converge. This is similar to the technique for expanding the convergence zone described in UK Patent Application No. 1100117.9, the contents of which are incorporated by reference. In particular, UK Patent Application No. 1100117.9 describes techniques for systematically testing different convergence zones for occupation by the receiver.

The convergence zone may be defined by the limits of the errors in estimated position and time that the algorithm is able to tolerate, whilst still providing a correct solution for position and time. Errors in the estimate of receiver location are normally expected to be along or in the receiver's LTP to the Earth. The convergence zone may effectively be extended by iterating over one or more ambiguities arising from the difficulty in identifying the correct arrival time for a particular signalling event at the receiver. There is a trade-off between the number of potential ambiguities that have to be searched and the size to which the convergence zone can be extended.

The number of ambiguities may be reduced by using as much a priori information as possible.

If the receiver has managed to obtain synchronisation with the data symbols or with bits of the navigation message, then the process locates ambiguities every 20 ms in time (or the equivalent in distance, which is approximately 6000 km). This results in many fewer ambiguities than when the receiver has only managed to achieve synchronisation with the code repetition interval (which is 1 ms for C/A code, equivalent to a distance of approximately 300 km). This is the reason why it may not be necessary to perform a Doppler fix when the receiver has managed to achieve bit synchronisation with all (or possibly only some) of the satellites. The number of potential ambiguities is sufficiently small that it is possible to perform the TOW-free calculation over all of them (should this prove to be necessary). Therefore, it is possible to achieve a location fix even when starting with the interior point as the estimate of the receiver location because iterating over all of the potential ambiguities extends the convergence zone to such an extent that the large error in the initial estimate of receiver position can be tolerated.

When the receiver has only managed to achieve synchronisation with the code repetition interval, the number of potential ambiguities is too large for it to be feasible to perform the TOW-free location calculation over all of them. Therefore, a more accurate estimate of receiver position obtained using the Doppler fix mechanism is used to seed the TOW-free algorithm. The TOW-free algorithm may still iterate over different ambiguity possibilities; however, to keep those ambiguities to a computationally feasible number a limited subset may be selected, e.g. multiples of +1, 0 and −1 of the code wavelengths.

The "single-difference" equation is of the form $\nabla r = \nabla H \cdot \Delta X$ (see equation 5). The left-hand side may be obtained as follows:

$$\begin{aligned}
\delta t_i &= \mathrm{mod}(\delta t_i, T) \text{ if} \\
(\delta t_i &> T/2) \delta t_i = \delta t_i - T \\
\delta r_i &= \frac{cT}{1000} \delta t_i
\end{aligned} \quad (39)$$

This is similar to equation (12), but with the equation rewritten to apply to ambiguities corresponding to an integer number of T ms, rather than an integer number of milliseconds. The reason for this difference is that in the introduction, this equation was presented in association with a specific example in which the receiver was only able to achieve synchronisation with the C/A code so that the time-of-arrival was only known sub-one-millisecond. It is, however, possible for the receiver to achieve a greater degree of synchronisation with the satellite signal (although still being unable to decode TOW information). For example, the receiver may be able to achieve synchronisation with the data symbol transition in the navigation message in the satellite signal. As a result, the ambiguity in each time-of-arrival may be considered as being equal to an integer number of T milliseconds rather than an integer number of one-milliseconds.

If there are ambiguity errors caused by being outside of the convergence zone then the rounding procedure in equation

(20) may be in error by an integer vector $\nabla H \cdot \Delta X = cT^*N + \Delta r$ where, for example, N might be $N=[0\ 1\ 0\ -1\ 0\ 0]$. If the number of possible ambiguities can be kept to a small and known number then it is possible to iterate over the possibilities and identify the vector which yields solutions close to the surface of the Earth. Providing there are six or more satellites visible to the receiver, the residuals should be small.

The transit times from the satellites range from around 67 ms to 89 ms: a spread of 24 ms. For five satellites this corresponds to $24^5$ possible ambiguities, which corresponds to approximately 8 million possible ambiguity vectors. Even if attention is restricted to a small portion of the Earth's surface, there are still too many ambiguities for it to be feasible computationally to iterate over them all. The algorithm thus focuses on the case where bit synchronisation has been achieved for all satellites. In this case the arrival time of a particular signalling event is known modulo 20 ms rather than modulo 1 ms for when only code synchronisation has been achieved (with GPS C/A code). The convergence zones may be increased substantially, roughly by a factor of 20, and the number of potential ambiguities is reduced. The largest ambiguity if bit synchronisation has been achieved is +/−1. So, for five satellites there are $3^5=243$ possible ambiguities. Furthermore, of these 243 possibilities only a few are really feasible given the knowledge of the constellation.

The possible ambiguities within the visibility horizon may be enumerated by building up a set of the possible vectors N that could have occurred starting from an initial interior point. Some of the ambiguity possibilities will be duplicates of each other once single differences are taken, so the duplicates can be eliminated from the list of ambiguities that need to be tested. This leaves typically only a handful of possibilities, usually around 5 although there may in rare cases be as many as 31. Each of the possible ambiguous choices is tested to identify the particular ambiguity set that yields a viable solution. When there are only 5 satellites, there are insufficient measurements to use the a posteriori residuals as a metric, however, the solution can be tested for consistency with a user being near or on the Earth's surface and/or within the visibility zone. Often the first possibility in the ambiguity set, [0 0 0 0 0], will yield a viable solution. The algorithms can be implemented on a modern processor with an execution time of a few hundred milliseconds. This method works in all cases simulated and gives the same position error performance as the standard single difference method but without the need for an initial position.

Figure 12:
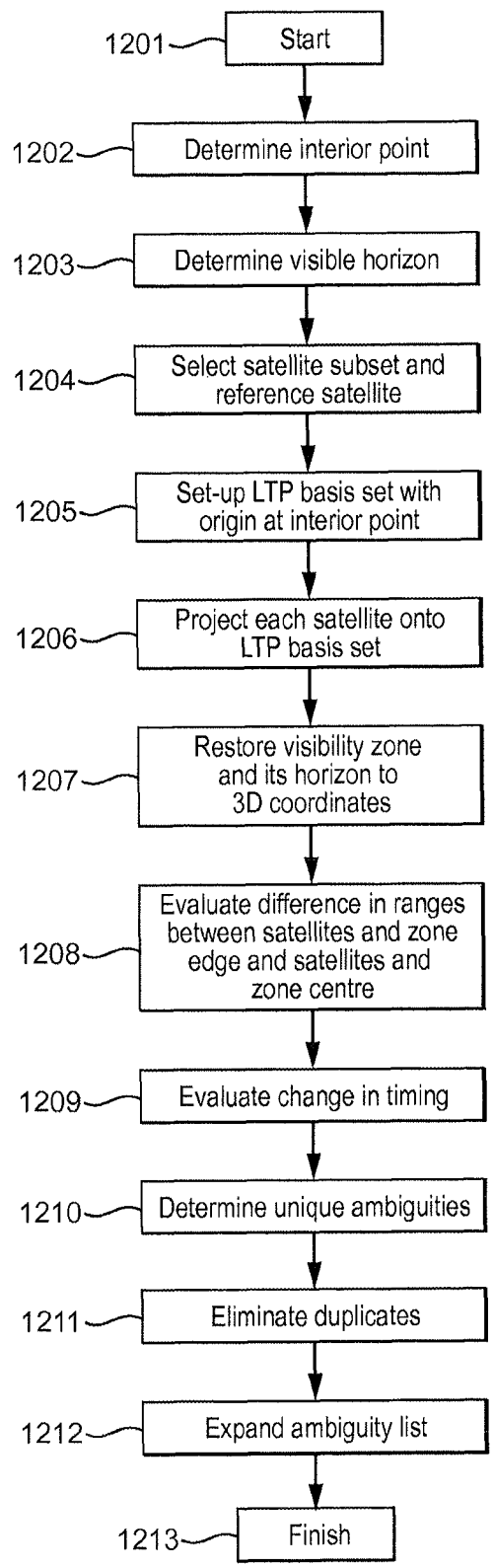
FIG. 12 shows an example of a method for enumerating ambiguities.

To restrict the possibilities further, the apparatus may be configured to apply an algorithm such as that illustrated in FIG. 12. The algorithm commences at step 1201. First, the algorithm identifies the interior point (step 1202), which enables the apparatus to then identify the visibility horizon (step 1203), i.e. a line on the Earth's surface which defines a boundary inside of which the observed satellites are visible and outside of which at least one is not. In this example, the TOW-free location calculation is to be performed by means of the single-difference method and so the process proceeds as normal for a single difference calculation by selecting a subset of the observed satellites and a reference satellite (step 1204). Further information about mechanisms for selecting a suitable satellite subset and reference satellite can be found in UK Patent Application No. 1100115.3 and UK Patent Application No. 1100116.1 respectively, both of which are incorporated by reference. Preferably a subset of 5 satellites is used for ambiguity enumeration.

The algorithm then commences the process of enumeration by setting up an LTP basis set with its origin at the interior point using the method of equation (15) (step 1205). Each satellite is then projected into the LTP basis set (step 1206):

$$\alpha_i = n_j \cdot a$$

$$\beta_i = n_j \cdot b$$

$$\gamma_i = n_j \cdot c \qquad (40)$$

where [a,b,c] is the LTP basis set, $n_j$ is the unit vector to satellite i, and $\alpha_i$, $\beta_i$, and $\gamma_i$ are the projection of $n_j$ onto the LTP.

Next, the visibility horizon and its origin are restored to ECEF coordinates (step 1207):

$$r(\gamma) = R_e \cos(\gamma)\sin(V(\gamma))a + R_e \sin(\gamma)\sin(V(\gamma))b + R_e \cos(V(\gamma))c$$

$$r_0 = R_e c \qquad (41)$$

where $V(\gamma)$ is the visibility zone on the unit sphere and $\gamma$ are the azimuthal angles at which the visibility zone is evaluated (i.e. 0 to 360 degrees in steps of 1 degree).

At this stage in the algorithm the apparatus is in a position to work out how much the time of arrival observation would be expected to change moving from the origin to each point on the edge of the visibility zone. The algorithm circles around the zone for each satellite and evaluates the difference in distance between the range of the satellite from the point at the zone edge compared with the range of the satellite from the zone centre (step 1208):

$$\delta_i(\gamma) = |r(\gamma) - x_{sat,i}| - |r_0 - x_{sat,i}| \qquad (42)$$

where $x_{sat,i}$ is the satellite position.

If the TOW-free location calculation is the single-difference method, the timing will change by (step 1209):

$$\Delta_i(\gamma) = \delta_i(\gamma) - \delta_{ref}(\gamma) \qquad (43)$$

since the single-difference method references each satellite to a reference satellite. $\delta_{ref}(\gamma)$ can be evaluated once and used to calculate all the $\Delta_i$.

If $\Delta_i/c$, where c is the speed of light, exceeds 10 ms then an incorrect positive rounding is possible for the satellite under consideration. This may be denoted by defining an ambiguity array which records the ambiguities for each satellite. For a positive ambiguity the $i^{th}$ element of this array will be set to 1 i.e. $a_i(\gamma)=+1$. If it is less than −10 ms then an incorrect negative rounding may have occurred i.e. $a_i(\gamma)=-1$ and otherwise $a_i(\gamma)=0$ indicating that it is un-ambiguous.

The next stage is to determine the unique ambiguities (step 1210). A quick way to do this is to express all the ambiguities as single numbers using, for example scaling onto a bitmap:

$$A(\gamma) = \sum_{i=0}^{NSV} 2^{2i}(a_i(\gamma) + 1) \qquad (44)$$

This use of $A(\gamma)$ is a computational convenience that allows for simple sorting and removal of duplicates. Prior to sorting it is worthwhile to eliminate consecutive duplicates which can be done easily in a single linear pass and will typically shrink the vector to a few percent of its former size (step 1211).

There is a potential pitfall with this method. If at the edge of the visibility zone several satellites have ambiguities then as the potential user position goes from the centre to the outside then the ambiguities to each satellite will be crossed at different points. This means that, for example, if [1 −1 0 0 0] is observed, then [1 0 0 0 0] and [0 −1 0 0 0] may also have to be included in the list of ambiguities to be tested. With further analysis it would be possible to identify which of these possibilities can actually occur. However, the preferred approach is simply to include all the possibilities in the search list (step 1212). Often the additional possibilities are already present. For each element, the appropriate ambiguity may be generated and tested to check whether it is already on the ambiguity list.

This process of expanding the ambiguities requires a loop from 1 to $2^{\Sigma|a_i|}-2$. For example if an ambiguity of a=[0 1 −1 −1 0] is observed at a particular point on the visibility horizon then $\Sigma|a_i|=3$ implying that a loop of $2^3-2=6$ is required. This is the case as the possible additional ambiguities are [0 1 0 0 0], [0 0 −1 0 0], [0 0 0 −1 0], [0 1 −1 0 0], [0 1 0 −1 0], [0 0 −1 −1 0]. Note the minus two is because both [0 0 0 0 0] and [0 1 −1 −1 0] are assumed to already be present in the ambiguity list. This implies that the worst case, with an ambiguity for each satellite, potentially introduces 30 new candidate ambiguities. The particular ambiguities can change moving around the visibility zone. The number of new ambiguities permitted is suitably capped at 20. 10,000 Monte Carlo simulations have indicated that this cap was not required, with the highest number of new ambiguities that were added though this process in the 10,000 simulations being 17.

The processing for working out the ambiguity set is likely to be dominated by the around 360×5=1800 square root operations required. Calculating these should be feasible in a few ms and with well written code the entire process of determining the possible ambiguity list should take only a few 10s of ms for interior point identification, visibility horizon calculation and ambiguity enumeration.

Currently the ambiguity list is ordered by the number of ambiguities crossed before execution. It is potentially possible to improve on this by searching the ambiguities which have the largest areas associated with them first or by using a surrogate metric that approximates this.

Figure 13A:
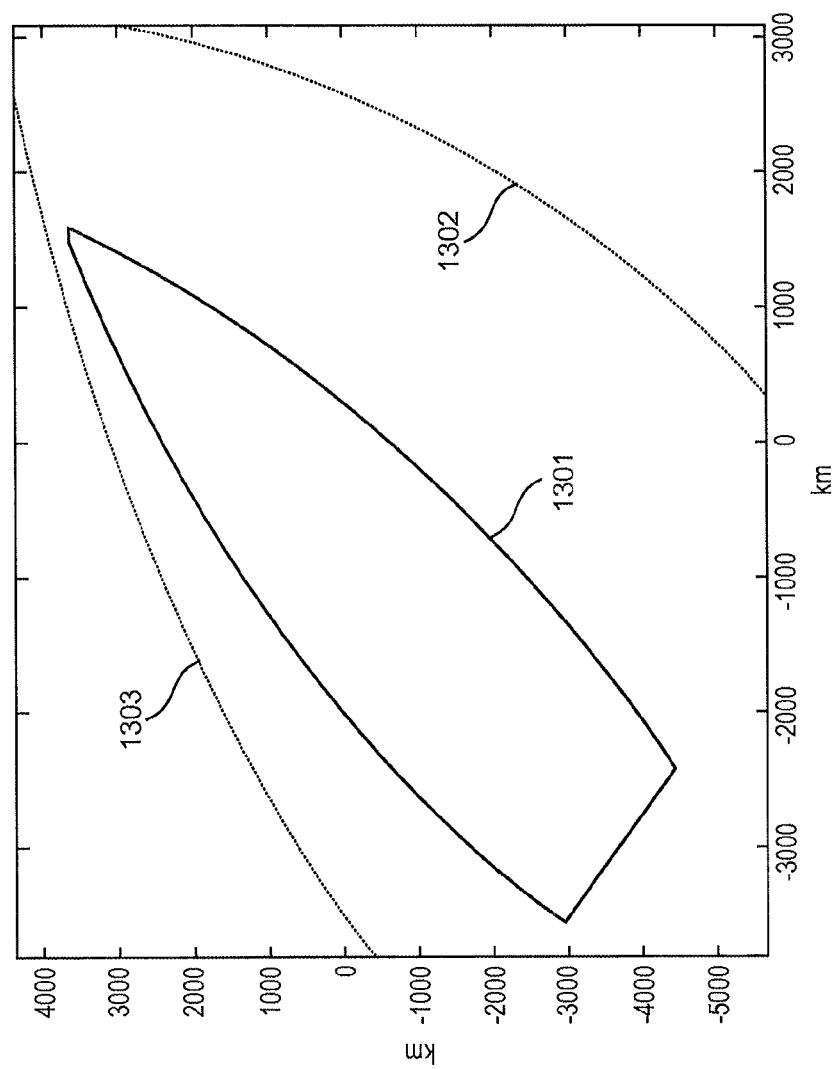
FIGS. 13a and 13b show examples of ambiguity lines.
Figure 13B:
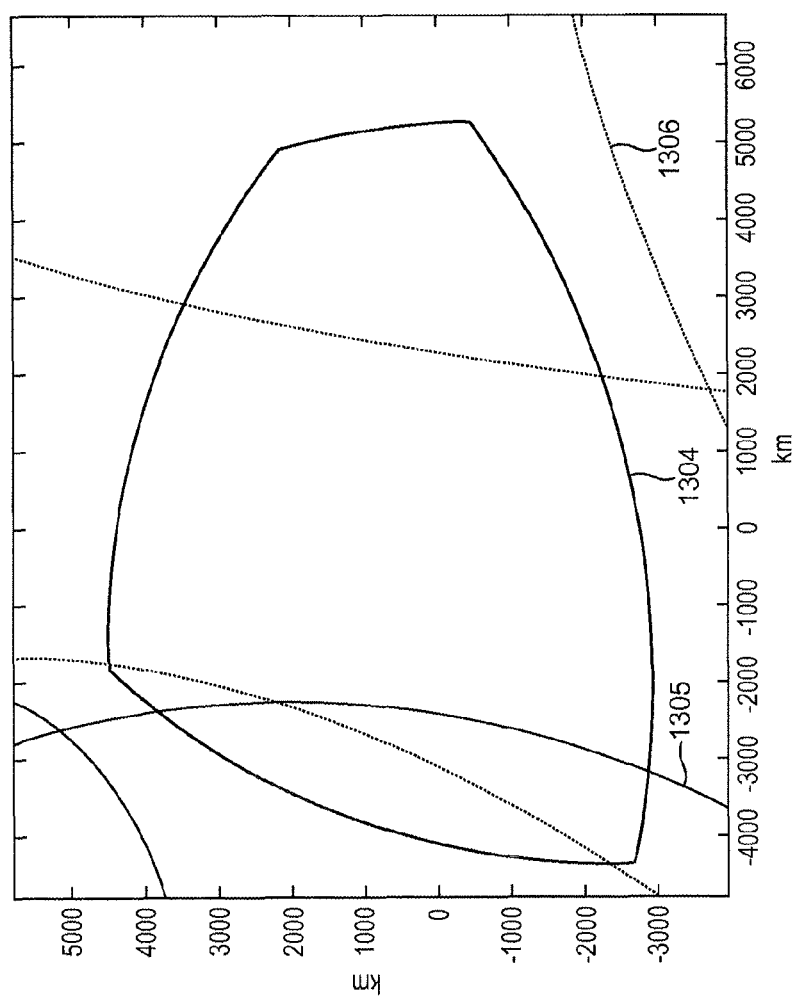

FIGS. 13a and 13b show some examples of ambiguity lines. The visibility horizons are shown in bold (e.g. 1301, 1304), the +10 ms ambiguity lines are solid (e.g. 1302, 1305) and the −10 ms ambiguity lines are dashed (e.g. 1303, 1306). FIG. 13a shows a relatively simple example, while the example in FIG. 13b is more complex.

The explanation above relates primarily to the situation when bit synchronisation has been achieved. Similar principles apply when bit synchronisation has not been achieved, except that in that scenario the number of ambiguities is deliberately restricted, e.g. to multiples of +1, 0 and −1 of the code wavelengths, so no attempt is made to identify all potential ambiguities.

Performing the Single-Difference Method Across Ambiguities

The final stage in obtaining a fix without having being given an approximate location is to modify the TOW-free method to iterate over the ambiguities. While this is straightforward in principle there are some issues that are worth describing so that they can be avoided. These problems are described below by way of example only and with specific reference to the single-difference method. However, similar principles may be applied to other TOW-free algorithms.

A detailed description of the single-difference method can be found in UK Patent Application No. 1100114.6, which is incorporated herein by reference.

The apparatus has at this point obtained an interior point, from which all the satellites are visible, a subset of 5 satellites to use, a reference satellite and a list of potential ambiguities which may occur. The subset and reference satellites are now considered fixed as the ambiguity set is only valid for a specific choice of these (actually they are only fixed for the first iteration of each ambiguity).

It is important that the first ambiguity in the list is [0 0 0 0 0] as this is by far the most likely case. For each ambiguity the algorithm begins by resetting the estimated absolute time and receiver position to their initial estimated values. For the receiver position, this may be the interior point. For the receiver time, this may be as estimated by a Doppler fix. It then proceeds as normal for a single difference calculation by linearising the almanac to obtain the direction cosines, distances from the initial user position to the satellites and the line of sight velocities.

From these and the timing observations, the single-difference observation matrix $\nabla H$ and the error vector $\Delta r$ can be calculated. As with the conventional single-difference method, calculation of the deviations is via:

$$\delta t_i = [\tilde{\tau}_i - \hat{d}_i/C - \tilde{\tau}_R - \hat{d}_R/C]/0.020 \quad (45)$$

where $\tilde{\tau}_i$ are the observation times, corrected for the satellite clock, and $\hat{d}_i$ are the estimated distances from the user to the satellites. $\delta t_i$ is now in units of 20 ms (rather than 1 ms as it is for code phase synchronisation). These deviations are now rounded to the nearest integer. At this stage, the relevant ambiguity may be inserted:

$$\delta t_i = \delta t_i + a_i \quad (46)$$

Where the vector a is the candidate ambiguity (i indexes satellites). For example on the first iteration a=[0 0 0 0 0]. In a subsequent iteration the candidate ambiguity might be e.g. a=[1 0 −1 0 0]. The vector may then be expressed as a distance (equation 47) before solving in the usual manner.

$$\delta r_i = 0.02 * c * \delta t_i \quad (47)$$

The ambiguity should only be added during the first iteration of the loop. Also, because the initial position guess can be poor (compared with, say, standard A-GPS), the initial solution for absolute time can be wildly wrong on the first iteration. To avoid this, the apparatus is preferably configured to update absolute time only after the first two iterations have been completed. Also, because of the poor initial estimates, the apparatus may require more iterations than in a standard TOW-free location calculation. Suitably the maximum number of iterations is set to 6, which is double the number typically required for the standard single difference calculation. To avoid wasting time iterating wildly wrong solutions, the ambiguity may be rejected if at any time after the first iteration the solution height is off by 50% of the Earth's radius. This undemanding condition catches most cases where the ambiguities are wrong. As with the standard single difference method, after the first iteration all the satellites may be used in the location calculation for improved accuracy, i.e. not just a subset of 5.

The calculation terminates in the same way as a normal single difference calculation after a fixed number of iterations, or when the residuals and state corrections fall below convergence thresholds. The final estimate of absolute time may be used to seed a standard GPS position fix. If it is determined that a fix has been obtained, then the calculation is terminated without evaluating the other ambiguities.

Apparatus Example

Figure 14:
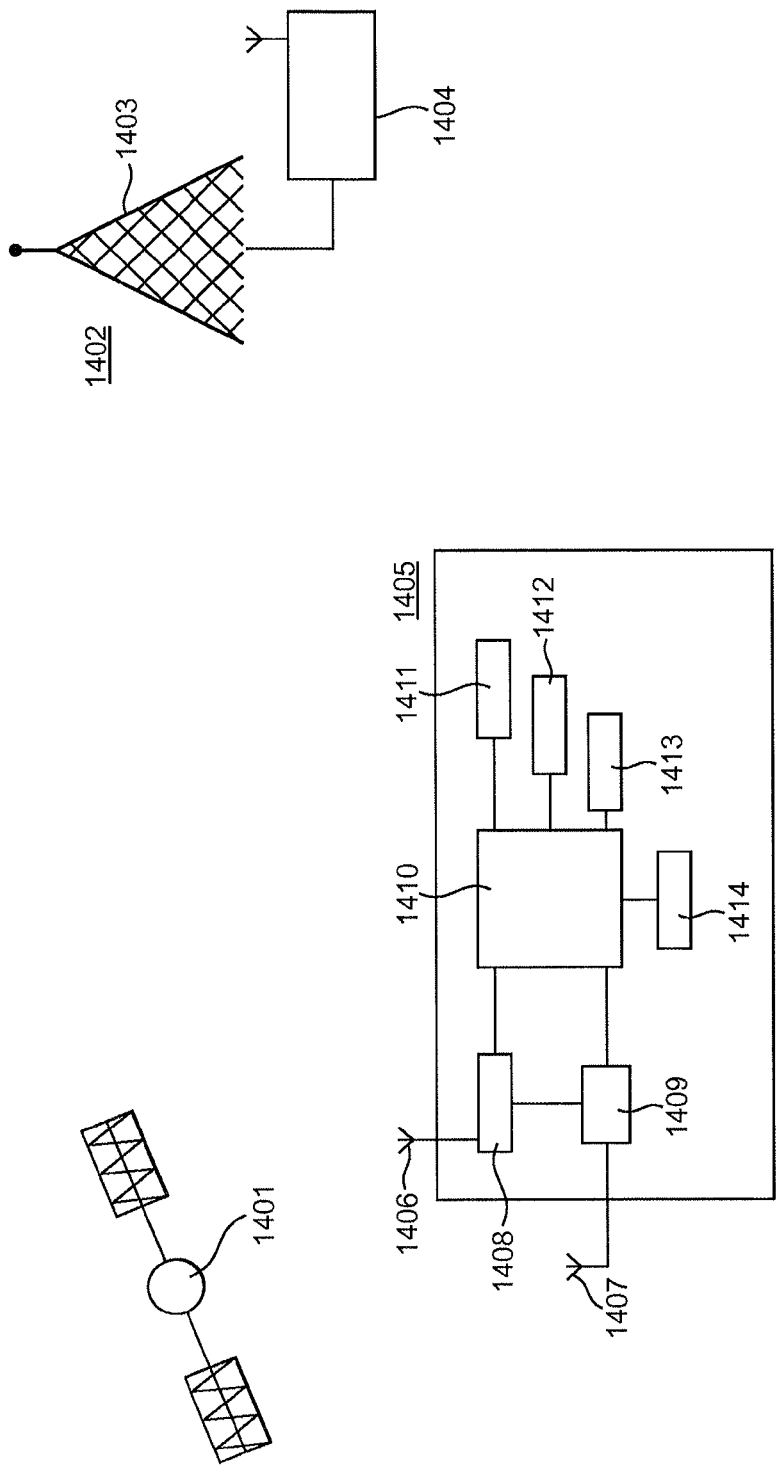
FIG. 14 shows an example of an apparatus.

An example of an apparatus suitable for implementing the location-determination algorithms described herein is shown generally in FIG. 14. The apparatus is shown generally at 1405. The algorithm may be implemented by a receiver or by a separate piece of apparatus. In this example, the apparatus is a handheld device such as a mobile phone, smart phone or similar.

In FIG. 14, the receiver comprises a GNSS antenna 1406 for receiving signalling events from a satellite 1401. The receiver also comprises GNSS receiver circuitry 1408 that is capable of identifying the times-of-arrival of signalling events transmitted by the satellite. The receiver may comprise a cellular transceiver 1409 and an associated antenna 1407 by means of which the receiver can receive and transmit messages with a cellular network. In this example, the cellular network is represented generally at 1402 and comprises a server 1404 connected to a radio tower 1403.

In some implementations the receiver 1405 may be arranged to transmit times-of-arrival information to the server 1404 for processing. The receiver 1405 might also be arranged to obtain initial position/timing/ephemeris information from the server 1404. (The server may be arranged to receive ephemeris information from radio tower 1403, which has a clear view of the sky for receiving GNSS signals from one or more satellites.) However, in a preferred embodiment receiver 1405 is capable of determining its position without contacting the server.

The receiver 1405 may comprise a location calculation unit 1410 connected to the GNSS receiver circuitry 1408. The location calculation unit may also be connected to a visibility determination unit 1411, a Doppler unit 1412, an ambiguity unit 1413 and a TOW-free algorithm unit 1414. The visibility determination unit may be arranged to determine the visibility horizon and interior point associated with a particular satellite constellation. The Doppler unit may be arranged to determine an improved approximation of receiver position via a Doppler process. The ambiguity unit may be arranged to determine a list of possible ambiguities and order that list according to priority. The TOW-free algorithm unit may be arranged to perform the location calculation. The TOW-free algorithm unit is preferably capable of performing a standard location calculation (linearised or otherwise) in addition to one or more TOW-free algorithms such as the single-difference algorithm.

The location calculation unit is suitably arranged to maintain overall control of the algorithm by passing data between the various other functional blocks. The location calculation unit may be arranged to perform the DoP and other confirmation calculations that check the validity of the updated position and absolute time estimates generated by the algorithm.

The apparatus shown in FIG. 14 is shown illustratively as comprising a number of interconnected functional blocks. This is for illustrative purposes and is not intended to define a strict division between different parts of hardware on a chip. In practice, the apparatus preferably uses a microprocessor acting under software control for implementing the algorithms described herein. In some embodiments, the algorithms may be performed wholly or partly in hardware. It may be advantageous in some implementations to provide dedicated hardware for performing some of the calculations.

Results

Simulations have been performed using the methods described above. The results of these are presented below, together with a brief description of how the simulations were conducted and any advantageous features that were identified by the simulations. The first set of results relates to simulations that were based on a scenario in which bit synchronisation had been achieved. The second set of results relates to simulations that were based on a scenario in which bit synchronisation had not been achieved.

With Bit-Synchronisation

The simulations were based on performing 6 iterations are used for each ambiguity; however, in practice, typically only 2 or 3 iterations may be required if the ambiguity is incorrect (since this will become apparent after only 2 or 3 iterations). A large percentage of the time the [0 0 0 0 0] ambiguity works and the calculation is able to converge from the interior point. In all simulations the location solution was acceptable given the expected uncertainties due to measurement noise and the correct ambiguities were identified.

Figure 15:
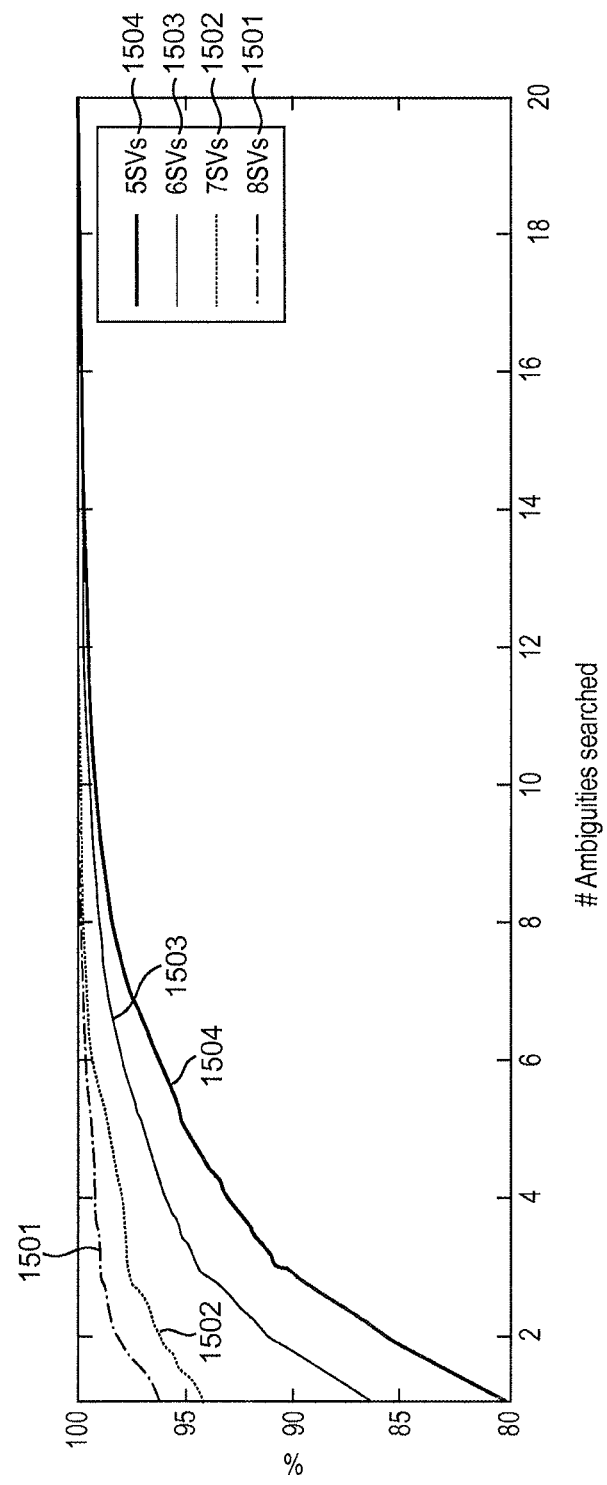
FIG. 15 shows the results of some simulations.
Figure 15:
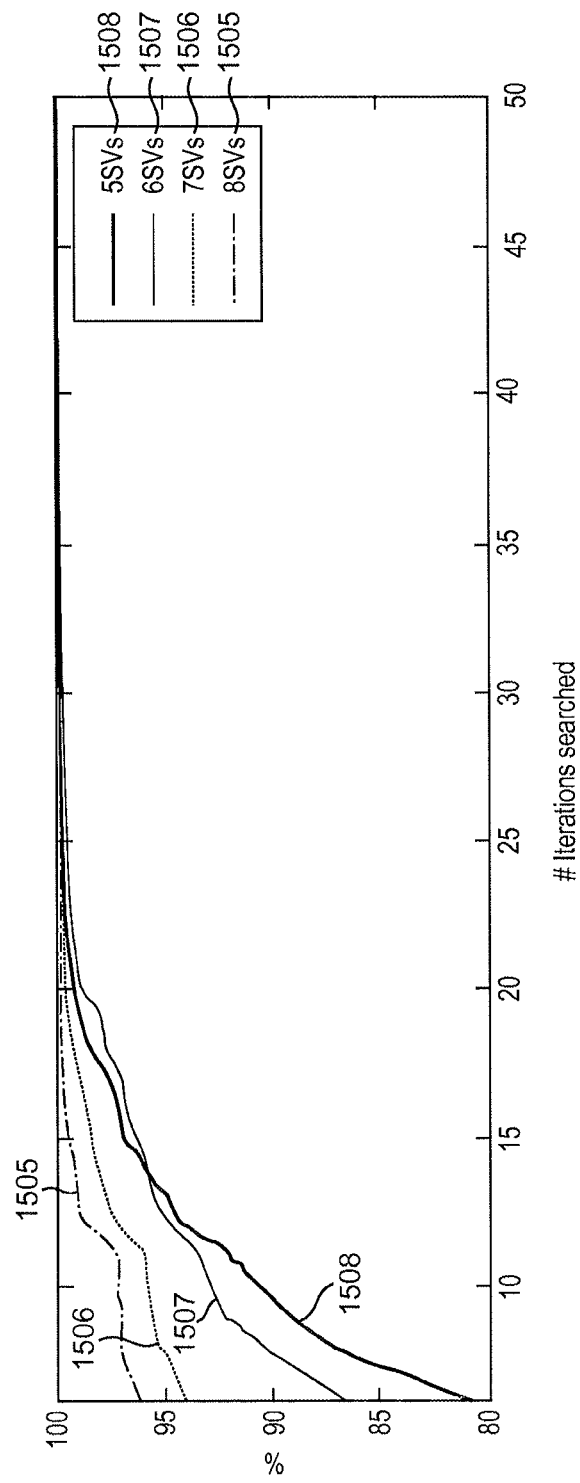

The graphs in FIG. 15 show the results of 1000 Monte Carlo simulations when bit-synchronisation has been achieved by 5, 6, 7 or 8 observable satellites. The maximum number of ambiguities searched was 19, 16, 15 and 14 for 5, 6, 7 and 8 satellites respectively. The maximum number of iterations was 35, 50, 31 and 44, also for 5, 6, 7 and 8 satellites respectively.

Figure 16:
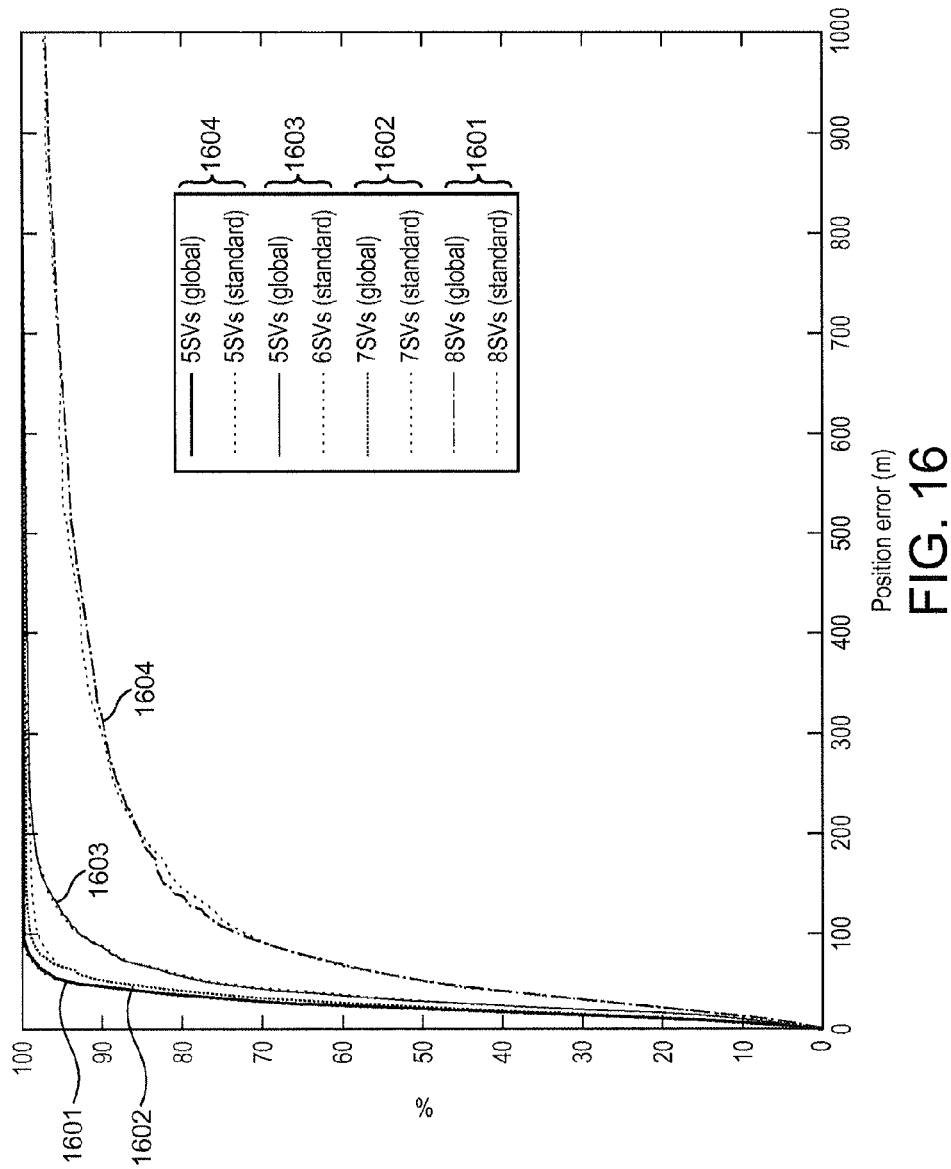
FIG. 16 shows the results of some simulations.

FIG. 16 shows a comparison of the 3D position errors for the global search method described herein when compared with the standard single difference method. The same measurement noise was used for both simulations. As can be seen from the fact that the solid lines and dotted lines largely coincide on the graphs, once the ambiguity has been resolved correctly the accuracy is essentially the same for both methods.

Without Bit-Synchronisation

The results from the simulations performed without bit-synchronisation give some useful indications about what constraints should or should not be applied to the Doppler calculation. More detail can be found below. Principally, the results indicate that constraining the user velocity to zero decreases accuracy, because it locks in a large error. A preferred option may therefore be to constrain GPS time, vertical user velocity and altitude, which leaves five variables to be solved for: x, y, $u_a$, $u_b$ and $C_d$.

Unless otherwise stated all simulations used 1000 Monte Carlo iterations and randomized receiver locations. Receiver speed was specified but the angle in the local tangent plane was randomized and the vertical component of the receiver speed was assumed to not exceed 0.1 of the total.

The different yield columns indicate the percentage of successful handovers to a single difference calculation for different numbers of ambiguities. The first column is the standard calculation with [0 0 0 0 0] assumed. The next is the 11 ambiguity column which includes [0 0 0 0 0] and also all single crossings i.e. [1 0 0 0 0], [0 0 −1 0 0] etc. The final column includes all 211 possible 1 ms ambiguity errors i.e. [1 −1 0 0 1] etc. Although there are $3^5=243$ possible combinations of these, because of the single differencing some are equivalent. For example [1 0 0 0 0] is equivalent to [0 −1 −1 −1 −1] because the differencing eliminates the constant difference. Taking this into account reduces the 243 possibilities to 211. This number may be cut substantially when bit synchronisation on some satellites is available as this gives roughly a factor of 3 for each satellite with bit synchronisation.

To get a feeling for the results, it is useful to first look at the performance when only receiver position (x,y,z) and clock frequency error ($C_d$) are solved for and receiver velocity and GPS time are assumed to be known.

TABLE 1

Results from Doppler Fix when user velocity and GPS time are fixed.

| | constraints | | | | errors | | | Doppler Fix Accuracy percentiles (km) | | | Yield (%) @ ambiguities checked | | |
|---|---|---|---|---|---|---|---|---|---|---|---|---|---|
| Nsatellite | tgps | Vz | V | altitude | $\Box f$ (Hz) | U (mph) | $t_{gps}(s)$ | $50^{th}$ | $67^{th}$ | $95^{th}$ | 1 ambiguity | 11 ambiguities | 211 ambiguities |
| 6 | 1 | 1 | 1 | 0 | 0 | 0 | 0 | 0 | 0 | 0.3 | 100 | 100 | 100 |
| 6 | 1 | 1 | 1 | 0 | 5 | 0 | 0 | 7.9 | 11.3 | 29.9 | 99.9 | 99.9 | 100 |
| 6 | 1 | 1 | 1 | 0 | 10 | 0 | 0 | 15.9 | 21.5 | 60.8 | 99.8 | 99.8 | 99.9 |
| 6 | 1 | 1 | 1 | 0 | 20 | 0 | 0 | 32.4 | 42.3 | 119.4 | 98.1 | 99.2 | 99.8 |
| 6 | 1 | 1 | 1 | 0 | 25 | 0 | 0 | 39.8 | 54 | 134.9 | 97.1 | 99 | 99.8 |
| 6 | 1 | 1 | 1 | 0 | 30 | 0 | 0 | 48.4 | 68.3 | 197 | 92.1 | 97.1 | 99.3 |
| 6 | 1 | 1 | 1 | 0 | 50 | 0 | 0 | 79 | 111.4 | 292.6 | 80.9 | 91.3 | 98.4 |
| 6 | 1 | 1 | 1 | 0 | 0 | 5 | 0 | 10.9 | 13.4 | 39.7 | 99.9 | 100 | 100 |
| 6 | 1 | 1 | 1 | 0 | 0 | 10 | 0 | 20.5 | 25.6 | 81.6 | 99.6 | 100 | 100 |
| 6 | 1 | 1 | 1 | 0 | 0 | 30 | 0 | 61.7 | 78.2 | 228.6 | 90.3 | 95.2 | 98.7 |
| 6 | 1 | 1 | 1 | 0 | 0 | 50 | 0 | 101.9 | 130.3 | 352.9 | 74.9 | 84.5 | 96.9 |
| 6 | 1 | 1 | 1 | 0 | 0 | 70 | 0 | 148.1 | 187.2 | 519.5 | 55.6 | 75.2 | 94.1 |
| 6 | 1 | 1 | 1 | 0 | 0 | 90 | 0 | 195.6 | 241.9 | 678.4 | 43 | 64.3 | 91.2 |
| 6 | 1 | 1 | 1 | 0 | 0 | 0 | 2 | 0.9 | 1.2 | 2.8 | 100 | 100 | 100 |
| 6 | 1 | 1 | 1 | 0 | 0 | 0 | 30 | 14.2 | 18.6 | 42.3 | 99.9 | 99.9 | 100 |
| 6 | 1 | 1 | 1 | 0 | 0 | 0 | 60 | 27.2 | 34.9 | 84.8 | 99.7 | 99.9 | 100 |
| 6 | 1 | 1 | 1 | 0 | 0 | 0 | 300 | 138.2 | 182.4 | 408.2 | 0.9 | 2.9 | 11.7 |

Table 1 shows that, roughly, a 10 km increase in position standard deviation can be due to either a 5 Hz increase in frequency noise, 5 mph of user motion error or 20 s error in GPS time. It also shows that that standard single difference calculation starts to fail at around 100 km of error and the 211 ambiguity version at roughly 200 km error. These numbers are specific to 6 satellites and the impact of satellite number is shown in Table 2 below, which indicates that dropping to 5 satellites from 6 increases the uncertainty by about 40% but going from 6 to 7 yields only a 20% further improvement.

Now let us investigate constraints with an example worst case. Suppose we have 25 Hz standard deviation of frequency uncertainty after acquisition and verification.

This is a pessimistic worst case for the frequency uncertainty, which in reality we would expect to be more like 10 Hz. A worst case user motion is 90 mph. For GPS time the possible worst case error is unbounded so we start by looking at a 2 s error i.e. when GPS time is almost correct. Also, it is anticipated that a GPS time uncertainty of 2 s will be achievable in many cases.

TABLE 2

Impact of no. of satellites on Doppler fix

| | constraints | | | | errors | | | Doppler Fix Accuracy percentiles (km) | | | Yield (%) @ ambiguities checked | | |
|---|---|---|---|---|---|---|---|---|---|---|---|---|---|
| No. of satellites | tgps | Vz | V | altitude | $\Box f$ (Hz) | U (mph) | $t_{gps}(s)$ | $50^{th}$ | $67^{th}$ | $95^{th}$ | 1 ambiguity | 10 ambiguities | 211 ambiguities |
| 5 | 1 | 1 | 1 | 0 | 25 | 30 | 30 | 98.4 | 137.9 | 477.6 | 67.1 | 81.1 | 95.9 |
| 6 | 1 | 1 | 1 | 0 | 25 | 30 | 30 | 77.1 | 101.2 | 285.2 | 81.2 | 92.4 | 98.5 |
| 7 | 1 | 1 | 1 | 0 | 25 | 30 | 30 | 62.9 | 79.7 | 205.7 | 91.9 | 97 | 99.9 |
| 8 | 1 | 1 | 1 | 0 | 25 | 30 | 30 | 58.5 | 72.2 | 171 | 95.9 | 99.3 | 100 |

TABLE 3

Effect of different constraints in a situation where the user motion uncertainty is large but GPS time uncertainty is small (2s). Grey indicates the recommended constraint

| | constraints | | | | errors | | | Doppler Fix Accuracy percentiles (km) | | | Yield (%) @ ambiguities checked | | |
|---|---|---|---|---|---|---|---|---|---|---|---|---|---|
| Nsatellite | tgps | Vz | V | altitude | $\Box$f (Hz) | U (mph) | $t_{gps}(s)$ | $50^{th}$ | $67^{th}$ | $95^{th}$ | 1 ambiguity | 10 ambiguities | 211 ambiguities |
| 8 | 0 | 0 | 0 | 0 | 25 | 90 | 2 | 183.9 | 293.4 | 3197 | 48.7 | 61.1 | 80.9 |
| 8 | 1 | 0 | 0 | 0 | 25 | 90 | 2 | 80.5 | 114.8 | 390.2 | 81.3 | 89.5 | 98 |
| 8 | 0 | 1 | 0 | 0 | 25 | 90 | 2 | 86.6 | 123 | 611.8 | 76.2 | 85.9 | 95.6 |
| 8 | 0 | 0 | 0 | 1 | 25 | 90 | 2 | 90.6 | 134.2 | 645.7 | 72.9 | 81.6 | 94.1 |
| 8 | 1 | 1 | 0 | 0 | 25 | 90 | 2 | 53.8 | 72.1 | 198.2 | 92.5 | 97.6 | 100 |
| 8 | 0 | 1 | 0 | 1 | 25 | 90 | 2 | 62.2 | 88.9 | 304.5 | 88 | 92.5 | 98.6 |
| 8 | 1 | 1 | 0 | 1 | 25 | 90 | 2 | 43.4 | 60.2 | 148.4 | 96 | 98.7 | 99.9 |
| 8 | 1 | 1 | 1 | 0 | 25 | 90 | 2 | 150.6 | 183.5 | 389.1 | 63.8 | 82.8 | 99.1 |

Table: 3 shows that leaving all the variables unconstrained even when 8 observations are available leads to large errors. Not surprisingly since there is only a 2 s error fixing GPS time is prudent and gives a substantial benefit. Constraining the vertical component of the fitted velocity to be zero also helps significantly as does constraining altitude. Constraining all three, time, vertical user motion and altitude provides a substantial further improvement. Constraining the user velocity to zero decreases accuracy, because it locks in a large error. The best thing to do under these conditions may be to constrain GPS time, vertical user velocity and altitude leaving 5 variables being solved for x, y, Ua, Ub, Cd.

Table 4 looks at how the situation changes as we reduce the number of satellites further. There is no point in reducing the constraints as the number of satellites is reduced so we consider only whether it is prudent to additionally constrain the velocity. For 7 satellites the situation is the same as for 8 but for 5 satellites is appears sensible to constrain the user velocity to zero. 90 mph is extreme and the impact of the velocity constraint will diminish as the user speed reduces. The 6 satellite case is marginal but it is felt that it is more important to have high yield at low speeds at the expense of significantly worsening the yield at high speeds. Also it is always possible to have the best of both worlds and attempt a fix with and without constraining the user velocity. Motion may also be detectable via other means which could aid this decision.

Table 5 shows results with the recommended settings for the constraints. As expected it shows that with the full 211 ambiguity search we do achieve significantly better results than the basic single difference. It is likely that if the full 211 search is conducted the system will work robustly. Note that the 11 ambiguity search gives percentage yield results roughly mid way between the single and full ambiguity cases. If the initial GPS time error is set to 60 s and we turn off the GPS time constraint then we obtain the statistics shown in Table 6. This was repeated with the GPS time error set to 300 s but the overall yield dropped to low single digit %. Only 100 Monte Carlo iterations were used for the results in Table 6. The overall conclusion is that if the GPS time error can be kept to a few seconds and a reasonable number of ambiguities can be searched, then these methods work well.

TABLE 4

As Table: 3 but with number of satellites reduced from 8. Darker colours indicate the recommended constraints.

| | constraints | | | | errors | | | Doppler Fix Accuracy percentiles (km) | | | Yield (%) @ ambiguities checked | | |
|---|---|---|---|---|---|---|---|---|---|---|---|---|---|
| Nsatellite | tgps | Vz | V | altitude | $\Box$f (Hz) | U (mph) | $t_{gps}(s)$ | $50^{th}$ | $67^{th}$ | $95^{th}$ | 1 ambiguity | 10 ambiguities | 211 ambiguities |
| 7 | 1 | 1 | 0 | 1 | 25 | 90 | 2 | 48.7 | 67.3 | 197.8 | 92.9 | 96.4 | 99.8 |
| 7 | 1 | 1 | 1 | 1 | 25 | 90 | 2 | 162.6 | 200.5 | 448.3 | 55.3 | 76 | 97.2 |
| 6 | 1 | 1 | 0 | 1 | 25 | 90 | 2 | 75.2 | 111.1 | 453.4 | 77.4 | 86.2 | 95.7 |
| 6 | 1 | 1 | 1 | 1 | 25 | 90 | 2 | 196.1 | 240 | 628.9 | 40.7 | 63.5 | 91.2 |
| 5 | 1 | 1 | 0 | 1 | 25 | 90 | 2 | 163.2 | 311 | 3103.7 | 46.7 | 57.8 | 79.1 |
| 5 | 1 | 1 | 1 | 1 | 25 | 90 | 2 | 239.7 | 309.9 | 870.6 | 28.3 | 49.7 | 87.7 |

TABLE 5

Single difference yield (%). GPS time error 2s. Number of satellites = 5, 6, 7, 8 from top.
>95% (light), >99% (dark)

| NAMB = 1 | | Frequency (Hz) | | | | | NAMB = 211 | | Frequency (Hz) | | | | |
|---|---|---|---|---|---|---|---|---|---|---|---|---|---|
| | | 5 | 10 | 15 | 20 | 25 | | | 5 | 10 | 15 | 20 | 25 |
| User speed (mph) | 0 | 95.8 | 94.6 | 95.7 | 94.1 | 90.2 | User speed (mph) | 0 | 96.1 | 95.7 | 96.9 | 95.8 | 96 |
| | 30 | 81.4 | 78.8 | 79.8 | 77.4 | 77 | | 30 | 95.6 | 95.8 | 95.8 | 95.2 | 95.3 |
| | 60 | 51.4 | 50.4 | 47.4 | 48.8 | 51 | | 60 | 93.9 | 90.7 | 93.5 | 92.8 | 91.7 |
| | 90 | 31.1 | 29.1 | 29.5 | 33.9 | 31.1 | | 90 | 89.7 | 89.7 | 88.6 | 89.9 | 87.4 |
| NAMB = 1 | | Frequency (Hz) | | | | | NAMB = 211 | | Frequency (Hz) | | | | |
| | | 5 | 10 | 15 | 20 | 25 | | | 5 | 10 | 15 | 20 | 25 |
| User speed (mph) | 0 | 99.1 | 99.6 | 98.9 | 98.3 | 97.8 | User speed (mph) | 0 | 99.6 | 99.9 | 99.2 | 99.6 | 99.8 |
| | 30 | 92.1 | 92.8 | 90.9 | 89.8 | 89.9 | | 30 | 99.3 | 99.6 | 99.2 | 98.4 | 99.1 |
| | 60 | 66.1 | 66.1 | 64.7 | 60.1 | 63.7 | | 60 | 96.9 | 96.7 | 97.5 | 95.1 | 96.4 |
| | 90 | 44.4 | 44.8 | 42.6 | 44 | 42.8 | | 90 | 92.3 | 93.4 | 92 | 94.2 | 91.1 |
| NAMB = 1 | | Frequency (Hz) | | | | | NAMB = 211 | | Frequency (Hz) | | | | |
| | | 5 | 10 | 15 | 20 | 25 | | | 5 | 10 | 15 | 20 | 25 |
| User speed (mph) | 0 | 97.6 | 98.2 | 95.5 | 94.4 | 91.4 | User speed (mph) | 0 | 99.8 | 99.8 | 99.7 | 99.5 | 99.1 |
| | 30 | 97.6 | 96.1 | 95.7 | 94.9 | 91.8 | | 30 | 99.6 | 99.8 | 99.5 | 99.6 | 99.4 |
| | 60 | 97.4 | 96.9 | 95.8 | 95.9 | 92.7 | | 60 | 99.8 | 100 | 99.6 | 99.6 | 99.5 |
| | 90 | 96.5 | 95.6 | 94.8 | 93.7 | 89.6 | | 90 | 99.8 | 99.8 | 99.7 | 99.5 | 99.1 |
| NAMB = 1 | | Frequency (Hz) | | | | | NAMB = 211 | | Frequency (Hz) | | | | |
| | | 5 | 10 | 15 | 20 | 25 | | | 5 | 10 | 15 | 20 | 25 |
| User speed (mph) | 0 | 99 | 99.1 | 98.4 | 98.7 | 97.3 | User speed (mph) | 0 | 100 | 100 | 100 | 100 | 100 |
| | 30 | 99.6 | 99.3 | 98.5 | 98.1 | 96.8 | | 30 | 100 | 100 | 99.9 | 99.9 | 99.9 |
| | 60 | 98.7 | 99.1 | 98.9 | 98 | 97.4 | | 60 | 99.9 | 99.9 | 99.8 | 100 | 99.9 |
| | 90 | 99.2 | 98.8 | 98.7 | 97.8 | 95.5 | | 90 | 100 | 99.9 | 99.9 | 99.9 | 99.9 |

TABLE 6

Single difference yield (%). GPS time error 60s. number of satellites = 5, 6, 7, 8 from top.
GPS time is unconstrained >95% (light), >99% (dark)

| NAMB = 1 | | Frequency (Hz) | | | | | NAMB = 211 | | Frequency (Hz) | | | | |
|---|---|---|---|---|---|---|---|---|---|---|---|---|---|
| | | 5 | 10 | 15 | 20 | 25 | | | 5 | 10 | 15 | 20 | 25 |
| User speed (mph) | 0 | 88 | 82 | 80 | 74 | 73 | User speed (mph) | 0 | 96 | 92 | 93 | 87 | 91 |
| | 30 | 66 | 61 | 57 | 54 | 54 | | 30 | 91 | 92 | 89 | 89 | 91 |
| | 60 | 32 | 28 | 34 | 35 | 23 | | 60 | 77 | 89 | 84 | 85 | 81 |
| | 90 | 14 | 18 | 21 | 17 | 20 | | 90 | 71 | 73 | 61 | 76 | 76 |
| NAMB = 1 | | Frequency (Hz) | | | | | NAMB = 211 | | Frequency (Hz) | | | | |
| | | 5 | 10 | 15 | 20 | 25 | | | 5 | 10 | 15 | 20 | 25 |
| User speed (mph) | 0 | 94 | 94 | 95 | 95 | 83 | User speed (mph) | 0 | 98 | 99 | 97 | 98 | 98 |
| | 30 | 71 | 76 | 70 | 76 | 63 | | 30 | 92 | 93 | 94 | 95 | 92 |
| | 60 | 42 | 47 | 47 | 46 | 40 | | 60 | 87 | 86 | 90 | 82 | 88 |
| | 90 | 31 | 31 | 29 | 32 | 24 | | 90 | 90 | 84 | 83 | 76 | 83 |
| NAMB = 1 | | Frequency (Hz) | | | | | NAMB = 211 | | Frequency (Hz) | | | | |
| | | 5 | 10 | 15 | 20 | 25 | | | 5 | 10 | 15 | 20 | 25 |
| User speed (mph) | 0 | 90 | 81 | 82 | 73 | 75 | User speed (mph) | 0 | 99 | 96 | 96 | 94 | 91 |
| | 30 | 89 | 89 | 83 | 72 | 80 | | 30 | 97 | 98 | 96 | 92 | 97 |
| | 60 | 88 | 87 | 79 | 82 | 64 | | 60 | 97 | 95 | 94 | 96 | 88 |
| | 90 | 85 | 78 | 79 | 76 | 73 | | 90 | 98 | 95 | 94 | 94 | 94 |
| NAMB = 1 | | Frequency (Hz) | | | | | NAMB = 211 | | Frequency (Hz) | | | | |
| | | 5 | 10 | 15 | 20 | 25 | | | 5 | 10 | 15 | 20 | 25 |
| User speed (mph) | 0 | 97 | 98 | 89 | 87 | 81 | User speed (mph) | 0 | 100 | 100 | 98 | 99 | 98 |
| | 30 | 93 | 89 | 94 | 92 | 85 | | 30 | 96 | 97 | 99 | 100 | 99 |
| | 60 | 95 | 91 | 92 | 90 | 86 | | 60 | 99 | 98 | 100 | 99 | 98 |
| | 90 | 95 | 93 | 89 | 84 | 84 | | 90 | 100 | 99 | 99 | 95 | 95 |

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

The invention claimed is:

1. An apparatus for determining a location of a receiver by means of signals received by the receiver from a plurality of satellites, the apparatus including:
   a processor executing an algorithm, the algorithm configuring the processor to:
   when an estimate of the location of the receiver is unavailable, determine an approximate location of the receiver and input the approximate location into the algorithm as the estimate of the location of the receiver,
   restrict the approximate location of the receiver by performing a Doppler fix based on the received satellite signals or by computing a visibility horizon associated with the satellite positions relative to the receiver,
identify and prioritize ambiguities in pseudoranges to the satellites from the restricted approximate location of the receiver, and
determine the location of the receiver by applying the pseudoranges, according to the respective identified and prioritized ambiguities, to a location algorithm.

2. An apparatus as claimed in claim 1, wherein the apparatus is configured to determine the approximate location of the receiver in dependence on the plurality of satellites from which the receiver receives the signals.

3. An apparatus as claimed in claim 1, wherein the apparatus is configured to determine the approximate location of the receiver in dependence on the positions of the plurality of satellites from which the receiver receives the signals.

4. An apparatus as claimed in claim 1, wherein the apparatus is configured to determine the approximate location of the receiver in dependence on a region of Earth's surface from which the plurality of satellites are simultaneously visible.

5. An apparatus as claimed in claim 4, wherein the apparatus is configured to determine the region of the Earth's surface from which the plurality of satellites are simultaneously visible in dependence on the positions of the plurality of satellites.

6. An apparatus as claimed in claim 4, wherein the apparatus is configured to determine a single point on the Earth's surface from which the plurality of satellites are simultaneously visible and to determine the region of the Earth's surface from which the plurality of satellites are simultaneously visible in dependence on that single point.

7. An apparatus as claimed in claim 6, wherein the apparatus is configured to determine the single point by:
determining a resultant of the position vectors of the plurality of satellites; and
determining the point on the Earth's surface through which the resultant passes.

8. An apparatus as claimed in claim 6, wherein the apparatus is configured to determine the single point by:
determining the points on the Earth's surface through which position vectors of the plurality of satellites pass; and
determining the centroid of a polygon formed by joining together those points.

9. An apparatus as claimed in claim 7, wherein the apparatus is configured to:
determine the dot products of the point on the Earth's surface through which the resultant passes and the position vectors of each of the plurality of satellites;
identify the minimum of the dot products; and
check that this minimum is consistent with the satellite that generated that dot product being above the horizon.

10. An apparatus as claimed in claim 8, wherein the apparatus is configured to:
determine the dot products of the centroid and the position vectors of each of the plurality of satellites;
identify the minimum of the dot products; and
check that this minimum is consistent with the satellite that generated that dot product being above the horizon.

11. An apparatus as claimed in claim 9, wherein the apparatus is configured to select either the point on the Earth's surface through which the resultant passes or the centroid as the single point in dependence on the minimum dot products.

12. An apparatus as claimed in claim 9, wherein the apparatus is configured to search a region of the Earth's surface surrounding the single point and to, if a better candidate for the single point is identified by means of that search, replace the single point with that candidate.

13. An apparatus as claimed in claim 12, wherein the apparatus is configured to search the region of the Earth's surface surrounding the single point by:
generating a list of candidate points in that region of the Earth's surface; and for each of the candidate points:
determining the dot products between that candidate point and the position vectors of the plurality of satellites;
identifying the minimum of the dot products; and
if that minimum dot product is larger than the minimum dot product associated with the single point, replacing the single point with the candidate point.

14. An apparatus as claimed in claim 1, wherein the apparatus is configured to determine the approximate location of the receiver in dependence on a Doppler effect associated with the signals.

15. An apparatus as claimed in claim 1, wherein the apparatus is configured to identify, for one of the pseudoranges, one or more of the ambiguities associated with a transit time for a signalling event to travel from one of the plurality of satellites to the receiver due to the receiver being unable to decode the time-of-transmission.

16. An apparatus as claimed in claim 15, wherein the apparatus is configured to perform one or more cycles of the location algorithm and to, for each cycle, input a different one of the identified ambiguities into the location algorithm.

17. An apparatus as claimed in claim 16, wherein the apparatus is configured to assign a priority to each of the identified ambiguities and to input those ambiguities into the location algorithm in priority order.

18. An apparatus as claimed in claim 16, wherein the apparatus is configured to, when a cycle of the algorithm successfully generates a location for the receiver, not perform further cycles of the algorithm with the remainder of the identified ambiguities.

19. A method for determining a location of a receiver when the receiver has been unable to decode a time-of-transmission from signals received by the receiver from a plurality of satellites and an estimate of the location of the receiver is unavailable, the method comprising:
determining, by a processor, an approximate location of the receiver based on satellite signals from the plurality of satellites;
inputting, by the processor that approximate location into an algorithm, as an estimate of the location of the receivers;
restricting, by the processor, the approximate location of the receiver by performing a Doppler fix based on the received satellite signals or by computing a visibility horizon associated with the satellite positions relative to the receiver,
computing, by the processor, pseudoranges to the visible satellites from the restricted approximate location of the receiver,
identifying and prioritizing, by the processor, ambiguities in the pseudoranges, and
determining, by the processor, the location of the receiver based on the identified and prioritized ambiguities in the pseudoranges.

20. A non-transitory computer-readable medium encoded with instructions, that when executed by an apparatus for determining a location of a receiver by means of signals received by the receiver from a plurality of satellites, cause the apparatus to:
when an estimate of the location of the receiver is unavailable, determine an approximate location of the receiver based on the satellites and input the approximate location into the algorithm as the estimate of the location of the receiver, restrict the approximate location of the receiver by performing a Doppler fix based on the received satellite signals or by computing a visibility horizon associated with the satellite positions relative to the receiver, identify and prioritize ambiguities in pseudoranges to the satellites from the restricted approximate location of the receiver, and determine the location of the receiver by applying the pseudoranges, according to the respective identified and prioritized ambiguities, to a location algorithm.

21. An apparatus configured to determine a region of the Earth's surface within which a receiver is located, the apparatus including:

a processor executing an algorithm, the algorithm configuring the processor to:

identify a plurality of visible satellites from which that receiver is receiving signals; and determine a region of the Earth's surface from which it is possible to simultaneously receive signals from the visible satellites as an approximate location of the receiver, and restrict the approximate location of the receiver by performing a Doppler fix based on the received satellite signals or by computing a visibility horizon associated with the satellite positions relative to the receiver in order to identify and prioritize ambiguities in pseudoranges to the visible satellites from the restricted approximate location of the receiver.

22. A method for determining a region of the Earth's surface within which a receiver is located comprising:

identifying, by a processor, a plurality of visible satellites from which the receiver is receiving signals; and determining, by the processor, a region of the Earth's surface from which it is possible to simultaneously receive signals from the visible satellites as an approximate location of the receiver, and restricting, by the processor, the approximate location of the receiver by performing a Doppler fix based on the received satellite signals or by computing a visibility horizon associated with the satellite positions relative to the receiver in order to identify and prioritize ambiguities in pseudoranges to the visible satellites from the restricted approximate location of the receiver.

23. A non-transitory computer-readable medium encoded with instructions, that when executed by an apparatus configured to determine a region of the Earth's surface within which a receiver is located, cause the apparatus to:

identify a plurality of visible satellites from which that receiver is receiving signals; and determine a region of the Earth's surface from which it is possible to simultaneously receive signals from the visible satellites as an approximate location of the receiver, and restricting, by the processor, the approximate location of the receiver by performing a Doppler fix based on the received satellite signals or by computing a visibility horizon associated with the satellite positions relative to the receiver in order to identify and prioritize ambiguities in pseudoranges to the visible satellites from the restricted approximate location of the receiver.

* * * * *

UNITED STATES PATENT AND TRADEMARK OFFICE
CERTIFICATE OF CORRECTION

Page 1 of 2

PATENT NO. : 9,030,355 B2
APPLICATION NO. : 13/344098
DATED : May 12, 2015
INVENTOR(S) : Jarvis et al.

It is certified that error appears in the above-identified patent and that said Letters Patent is hereby corrected as shown below:

IN THE DRAWINGS

In Fig. 7, Sheet 7 of 18, for Step "703", in Line 3, delete "satelite" and insert -- satellite --, therefor.

IN THE SPECIFICATION

In Column 15, Line 65, delete "trignometric" and insert -- trigonometric --, therefor.

In Column 18, Line 55, delete "$\rho_i = R_e i\ R_i$" and insert -- $\rho_i = R_e/R_i$ --, therefor.

In Column 18, Line 60, delete "Where" and insert -- where --, therefor.

In Column 20, Line 52, delete "Where" and insert -- where --, therefor.

In Column 20, Line 57, delete "and JP" and insert -- and $\beta_i$ --, therefor.

In Column 22, Lines 47-53, after equation insert -- (37) --.

In Column 23, Line 23, delete "$r_0 = r_e \hat{r} | | \hat{r} |$," and insert -- $r_0 = r_e \hat{r} / |\hat{r}|$ , --, therefor.

In Column 26, Line 7, delete "$\gamma_i = n_j.c$" and insert -- $\gamma_i = n_i.c$ --, therefor.

In Column 26, Line 8, delete "$n_j$ is the" and insert -- $n_i$ is the --, therefor.

In Column 26, Line 9, delete "$n_j$ onto" and insert -- $n_i$ onto --, therefor.

In Column 26, Line 44, delete "$a_j(\gamma)=+1$." and insert -- $a_i(\gamma)=+1$. --, therefor.

Signed and Sealed this
Twenty-fourth Day of November, 2015

Michelle K. Lee
*Director of the United States Patent and Trademark Office*

CERTIFICATE OF CORRECTION (continued)
U.S. Pat. No. 9,030,355 B2

IN THE SPECIFICATION

In Column 26, Line 45, delete "$a_j(\gamma)=-1$" and insert -- $a_i(\gamma)=-1$ --, therefor.

IN THE CLAIMS

In Column 38, Lines 46-47, in Claim 19, delete "receivers;" and insert -- receiver; --, therefor.